US011521238B2

(12) United States Patent
Shishkin et al.

(10) Patent No.: US 11,521,238 B2
(45) Date of Patent: Dec. 6, 2022

(54) METHOD AND SYSTEM FOR DETERMINING FACT OF VISIT OF USER TO POINT OF INTEREST

(71) Applicant: YANDEX EUROPE AG, Lucerne (CH)

(72) Inventors: Alexandr Leonidovich Shishkin, Moscow (RU); Irina Anatolievna Goltsman, Moscow (RU); Danil Vadimovich Petrov, Chuvashiya (RU); Denis Evgenievich Shaposhnikov, Krasnodar (RU)

(73) Assignee: YANDEX EUROPE AG, Lucerne (CH)

( * ) Notice: Subject to any disclaimer, the term of this patent is extended or adjusted under 35 U.S.C. 154(b) by 135 days.

(21) Appl. No.: 17/209,920

(22) Filed: Mar. 23, 2021

(65) Prior Publication Data

US 2021/0209645 A1    Jul. 8, 2021

Related U.S. Application Data

(62) Division of application No. 16/573,195, filed on Sep. 17, 2019, now Pat. No. 10,963,917.

(30) Foreign Application Priority Data

Dec. 26, 2018    (RU) .......................... RU2018146463

(51) Int. Cl.
*G06Q 30/02*    (2012.01)
*H04W 4/021*    (2018.01)
(Continued)

(52) U.S. Cl.
CPC ......... *G06Q 30/0261* (2013.01); *G06N 20/00* (2019.01); *H04W 4/021* (2013.01);
(Continued)

(58) Field of Classification Search
CPC ... G06Q 30/0261; H04W 4/029; H04W 4/021
See application file for complete search history.

(56) References Cited

U.S. PATENT DOCUMENTS 6,831,563 B1    12/2004  Contractor
8,489,596 B1    7/2013   Milton et al.
(Continued)

FOREIGN PATENT DOCUMENTS

RU    2008139294 A    4/2010
RU    2408151 C2      12/2010
(Continued)

OTHER PUBLICATIONS

Shaw et al., "Learning to Rank for Spatiotemporal Search", WSDM'13, Proceedings of the sixth ACM international conference on Web search and data mining, 2013, Rome, 10 pages.
(Continued)

*Primary Examiner* — Scott C Anderson
(74) *Attorney, Agent, or Firm* — BCF LLP

(57) ABSTRACT

A method of determining a Place Visit Lift (PVL) metric by determining a plurality of users using wireless devices that have been exposed to a targeted message associated with the POI within a first pre-determined time period and receiving a plurality of sets of local area communication features of the local area communication modules of the wireless devices. These features are inputted into a Machine Learning Algorithm (MLA) trained using a set of heuristics applied to training sets of local area communication features of training wireless devices. The MLA outputs, based on the set of local area communication features of the local area communication module of the wireless device, a plurality of indications of the conversion rate of the targeted message. The method comprises determining based on the plurality of indications,
(Continued)

the at least one of the visitors_site, the bypassers_site, the visitors_non-site, and the bypassers_non-site parameters.

16 Claims, 8 Drawing Sheets

(51) Int. Cl.
　　　*H04W 64/00*　　　(2009.01)
　　　*G06N 20/00*　　　(2019.01)
　　　*H04W 84/12*　　　(2009.01)
　　　*H04W 4/029*　　　(2018.01)
(52) U.S. Cl.
　　　CPC ......... *H04W 4/029* (2018.02); *H04W 64/003* (2013.01); *H04W 84/12* (2013.01)

(56) References Cited

U.S. PATENT DOCUMENTS

| | | | |
|---|---|---|---|
| 8,965,871 | B2 | 2/2015 | Kelley et al. |
| 9,135,655 | B2 | 9/2015 | Buchalter et al. |
| 9,639,858 | B2 | 5/2017 | Busch |
| 9,773,209 | B1 | 9/2017 | Champaneria et al. |
| 2008/0188207 | A1 | 8/2008 | Lee |
| 2009/0005987 | A1 | 1/2009 | Vengroff et al. |
| 2009/0234745 | A1 | 9/2009 | Ramer et al. |
| 2011/0258049 | A1 | 10/2011 | Ramer et al. |
| 2012/0209709 | A1 | 8/2012 | Ramer et al. |
| 2013/0124315 | A1 | 5/2013 | Doughty et al. |
| 2013/0124327 | A1 | 5/2013 | Doughty et al. |
| 2013/0267255 | A1 | 10/2013 | Liu et al. |
| 2016/0019257 | A1 | 1/2016 | Wither |
| 2016/0189186 | A1 | 6/2016 | Fabrikant et al. |
| 2016/0247175 | A1 | 8/2016 | Milton et al. |
| 2016/0350812 | A1 | 12/2016 | Priness et al. |
| 2017/0017991 | A1 | 1/2017 | Cochrane et al. |
| 2017/0255988 | A1 | 9/2017 | Calio |
| 2018/0047063 | A1 * | 2/2018 | Tuchman ............ G06Q 30/0269 |
| 2018/0063279 | A1 | 3/2018 | Hughes et al. |
| 2018/0089709 | A1 * | 3/2018 | Rousseau-Villella ........................ G06Q 30/0224 |
| 2019/0012680 | A1 | 1/2019 | Mello et al. |
| 2019/0327580 | A1 | 10/2019 | Chang et al. |
| 2020/0042742 | A1 | 2/2020 | Bailey |
| 2020/0112835 | A1 | 4/2020 | Li et al. |

FOREIGN PATENT DOCUMENTS

| | | | |
|---|---|---|---|
| RU | 2458487 | C1 | 8/2012 |
| RU | 2011143231 | A | 5/2013 |
| WO | WO-2008134595 | A1 * | 11/2008 ............. G06Q 30/02 |

OTHER PUBLICATIONS

Notice of Allowance with regard to the U.S. Appl. No. 16/573,195 dated Feb. 3, 2021.
Search Report with regard to the counterpart RU Patent Application No. 2020113271 completed Feb. 7, 2022.
English Abstract for RU 2408151 retrieved on Espacenet on Feb. 14, 2022.
Office Action with regard to the counterpart U.S. Appl. No. 16/573,204 dated Jul. 6, 2021.
Office Action with regard to the counterpart U.S. Appl. No. 16/573,204 dated Nov. 9, 2021.
Search Report with regard to the counterpart RU Patent Application No. 2020113269 completed Mar. 4, 2022.
English Abstract for RU2011143231 retrieved on Espacenet on Mar. 16, 2022.

* cited by examiner

| Used Device ID | 206 |
|---|---|
| Position | Time Stamp |
| 40° 41' 21.4"N 74° 02' 40.2"N | 13:45 |
| 40° 41' 21.4"N 74° 02' 40.3"N | 13:47 |
| 40° 41' 21.5"N 74° 02' 40.4"N | 13:49 |
| 40° 41' 21.5"N 74° 02' 40.6"N | 13:51 |
| ⋮ | ⋮ |
| ⋮ | ⋮ |

FIG. 2

METHOD AND SYSTEM FOR DETERMINING FACT OF VISIT OF USER TO POINT OF INTEREST

CROSS-REFERENCE

The present application is a Divisional application of a U.S. patent application Ser. No. 16/573,195, filed on Sep. 17, 2019, entitled "METHOD AND SYSTEM FOR DETERMINING FACT OF VISIT OF USER TO POINT OF INTEREST", which, in turn, claims priority to a Russian Patent Application No. 2018/146,463 bearing the same title, filed on Dec. 26, 2018. The entirety of both is incorporated herein by reference.

FIELD

The present technology relates to computer implemented methods and systems for determining facts of visits of users to points of interests.

BACKGROUND

Wireless devices, such as smartphones and Wi-Fi™ enabled tablets are ubiquitously used by users. Many such wireless devices include one or more geo-location systems, such as one or more Global Positioning Systems (GPS), that enable the wireless devices to determine their own geo-location.

For various uses and applications, it may be desirable to determine from the geo-locations of users, either in real time or by processing existing geo-track data provided by the users' wireless devices, when the users are visiting various Points of Interest (POIs). Examples of POIs may include parks or other attractions, businesses, private residences, and so on. In some cases, it may be desirable to determine, from the geo-locations of users, either in real time or by processing existing geo-track data provided by the users' wireless devices, the name and/or other information relating to each particular POI the users are visiting.

The prior art geo-location systems, including the geo-location systems of the wireless devices themselves, are suitable for such purposes at least in some cases. For example, many prior art geo-location systems are typically suitable to determine when a given user is visiting a large park that has few or no other POIs nearby. In such a situation, a given wireless device may determine its geo-location with a relatively high level of certainty, compared to when the same device may be located in a highly dense urban geographical area having a large number of POIs nearby.

In other circumstances, however, prior art geo-location systems may be inaccurate, and in some particular cases simply non-usable. For example, the denser a given geographical area visited by a user is in terms of the number of POIs in the area, the less reliable prior art geo-location systems tend to be due at least in part to increasing uncertainties related to the accuracy of the geo-locations provided by such geo-location systems and due to an increasing number of possible POIs that a user may be visiting in any given geo-location.

Some geo-location systems have been developed to improve upon at least some of the drawbacks described above.

For example, U.S. Pat. No. 9,639,858 B2, entitled "SYSTEMS AND METHODS TO ATTRIBUTE REAL-WORLD VISITS OF PHYSICAL BUSINESS LOCATIONS BY A USER OF A WIRELESS DEVICE TO TARGETED DIGITAL CONTENT OR PUBLICLY DISPLAYED PHYSICAL CONTENT PREVIOUSLY VIEWABLE BY THE USER", and assigned to Facebook Inc., teaches methods and systems that record the location of a user and transmit targeted content to a user based upon their current and past location information. A network is configured to include a server programmed with a database of targeted content, a database of location information, a database of user information, a database searching algorithm, and a wireless communication system capable of communicating with the user's mobile device. The location of the mobile device is ascertained and recorded. The location information is analyzed to determine the routes taken by the user, businesses visited by the user, and other behaviors of the user. Targeted content is sent to the mobile device of the user or exposure to physical content is tracked. Whether the user visits the physical locations associated with the content is monitored. Detailed conversion tracking is provided to producers of targeted content and business owners.

As another example, U.S. Pat. No. 9,135,655 B2, entitled "SYSTEMS AND METHODS FOR USING SERVER SIDE COOKIES BY A DEMAND SIDE PLATFORM", and assigned to MediaMath Inc., teaches methods for identifying a user by a demand side platform (DSP) across advertiser exchanges. The method includes establishing, by a DSP, a cookie mapping for a user. The cookie mapping includes a mapping of user identifiers for the user from advertisement exchanges to a user identifier assigned by the DSP for the user. The DSP stores to the cookie mapping a first mapping to the user identifier of the DSP, comprising a first user id received by a bidder from a first exchange and a first exchange id for the first exchange. A bidder inserts a pixel into a bid for an impression opportunity to a second exchange. The pixel includes a key to the cookie mapping and a second user id for the user and a second exchange id. The second user id is received by the bidder from a second exchange.

As yet another example, Patent Application Number US 2009/0234745 A1, entitled "METHODS AND SYSTEMS FOR MOBILE COUPON TRACKING", and assigned to Millennial Media LLC, teaches a method and system for presenting a sponsored mobile coupon to a mobile communication facility based at least in part on a relevancy, wherein the relevancy is based at least in part on a mobile subscriber characteristic, redeeming the coupon at an offline sponsor location using the mobile communication facility, recording conversion of the coupon in a conversion data repository, transmitting the conversion data repository to a wireless carrier, and analyzing the conversion data repository to determine an action.

While these other prior art systems and methods described above may be suitable for at least some of their intended purposes, they nonetheless have their own drawbacks.

SUMMARY

The present technology has been developed with a view to improving at least upon some of the drawbacks of prior art geo-location systems for at least some particular applications.

In summary, the present technology provides methods and systems for determining facts of visits by identified, or identifiable, users to identified, or identifiable, points of interest (POIs). The methods and systems use a particularly configured Machine Learning Algorithm (MLA) which determines the facts of visits of a given one or more users based on the Wi-Fi and/or other wireless networks detected by the given one or more users' wireless devices. In some particular non-limiting embodiments of the present technology, the systems include a server that is used to develop a particular training dataset and train the MLA using the particular training dataset.

In some such embodiments, the server executes a metrics module, a POI fingerprint module, a feature engineering module, a training dataset generating module, and an MLA training module. Each of these modules is described in detail in later in this document. At least one non-limiting embodiment of each of the modules is summarized herein next. It should be understood that while a particular set of modules is described in this document, the functionality achieved thereby may be achieved using a different set of modules and/or configurations of the server.

In summary, the metrics module accesses wireless devices of users in a particular geographical area of interest, and obtains timestamped local area network (LAN) snapshots from each of these wireless devices over a period of time. These snapshots represent Wi-Fi networks detected by the wireless devices at particular times and geo-locations. From each of the obtained LAN snapshots, the metrics module removes dynamic and mobile LANs, leaving only information about static LANs. The metric module thereby removes less reliable features/indicators/data from the LAN snapshots.

In summary, the POI fingerprint module uses a subset of the LAN snapshots determined by the metrics module to generate at least one POI fingerprint for each POI in the geographical area of interest, which POI was visited at least once over the pre-determined timeframe. To this end, the POI fingerprint module obtains timestamped geo-tracks of the wireless devices of the users and applies to them a set of heuristics that determines facts and times of visits of the users to the POIs in the geographical area. For each determined fact of visit of a particular user having a particular wireless device, the POI fingerprint module retrieves the LAN snapshot as detected by that particular wireless device at the time of the determined fact of visit.

The POI fingerprint module thereby generates, for each at-least-once-visited POI in the geographical area, at least one, and in many cases, a plurality of LAN snapshots captured from "within" the at-least-once-visited POI. The POI fingerprint module filters out noise from the obtained LAN snapshot sets using known statistical techniques, and amalgamates each set of LAN snapshots for a given POI into a single POI fingerprint of that given POI. Thus, in a sense, the POI fingerprint of a POI represents, inter alia, a typical set of Wi-Fi's and their characteristics that may be expected to be detected by a wireless device "visiting" that POI. In some embodiments, a statistics module further develops additional metrics and features associated with each of the POI fingerprints.

Next, the feature engineering module executes various comparisons of the data obtained by the abovementioned modules, and identifies features of the given POI fingerprint that distinguish visits to a first POI from visits to a second POI. A training dataset is then inputted by an MLA training module into the MLA to train the MLA.

In use, the trained MLA may receive as input a given LAN snapshot as detected by a given wireless device of a given user at a given time. In some cases, the MLA may receive a series of such inputs, corresponding to different times at which the given wireless device reported its geo-location. In some cases, the series of inputs may correspond to the user of the wireless device moving around in the geographical area of interest. For each such input, the MLA determines whether or not the user is visiting a given one of the POIs in the geographical area at the time associated with the input.

With the above summary in mind, and according to a first aspect of the present technology, there is provided a method of determining a Place Visit Lift (PVL) metric, the method being executed at a server having a processor and a non-transient memory communicatively coupled to the processor, the non-transient memory storing processor-executable instructions thereon for executing the method.

The method includes determining, by the server, a visitors_site parameter, the visitors_site parameter being equal to a number of users that both: a) were exposed to a targeted message directing users to a point of interest (POI), the POI being in a location, the location being associated with a local area network (LAN), the LAN including at least one wireless access point broadcasting a wireless signal and b) visited the POI after having been exposed to the targeted message; determining, by the server, a bypassers_site parameter, the bypassers_site parameter being equal to a number of users that did not visit the POI after having been exposed to the targeted message; determining, by the server, a visitors_non-site parameter, the visitors_non-site parameter being equal to a number of users that were not exposed to the targeted message but visited the POI; determining, by the server, a bypassers_non-site parameter, the bypassers_non-site parameter being equal to a number of users that were not exposed to the targeted message and did not visit the POI; and determining, by the server, the PVL metric according to a formula:

$$PVL = \frac{visitors\_site / bypassers\_site}{visitors\_non\text{-}site / bypassers\_non\text{-}site} * 100\% - 100\%.$$

At least one of the visitors_site, the bypassers_site, the visitors_non-site, and the bypassers_non-site parameters being determined by determining during an in-use phase, by the server, a plurality of users that have been exposed to the targeted message associated with the POI within a first pre-determined time period, a given user of the plurality of users using a respective wireless device having a local area communication module and a wireless device identifier associated with the local area communication module; receiving during the in-use phase, at the server based on the wireless device identifiers of the wireless devices of the plurality of users, a plurality of sets of local area communication features of the local area communication modules of the wireless devices; inputting, by the server into a Machine Learning Algorithm (MLA) as an in-use input, the plurality of sets of local area communication features of the wireless devices, the MLA having been trained during a training phase based on a training dataset associated with the POI, the training phase having preceded the in-use phase.

A given training object of the training dataset having been generated by determining at least one geo-location of a training wireless device of a training user, the at least one geo-location having a time associated therewith that occurred before the given time, the POI being in a pre-determined vicinity of the at least geo-location; determining a set of training local area communication features that the training wireless device had at the time associated with the at least one geo-location, the set of training local area communication features including an indication of the training wireless device having detected from the at least one geo-location the wireless signal of the at least one wireless access point of the LAN, the training wireless device having a training wireless device identifier, and a training local area communication module, applying during the training phase a set of heuristics to a user profile associated with the training user to generate a training label indicative of whether the training user visited the POI at the time associated with the at least one geo-location, and thereby generating during the training phase the given training object having the set of training local area communication features and the training label associated therewith.

The method further includes receiving, by the server from the MLA as an in-use output based on the plurality of sets of local area communication features of the wireless devices, a plurality of indications, a given indication of the plurality of indications being associated with the given user of the plurality of users and indicating whether the given user visited the POI within a second pre-determined time period after having been exposed to the targeted message; and determining during the in-use phase, by the server, based on the plurality of indications, the at least one of the visitors_site, the bypassers_site, the visitors_non-site, and the bypassers_non-site parameters.

In some implementation of the method, the user profile comprises a user specific portion and a device specific portion.

In some implementation of the method, the set of heuristics comprises a first subset of heuristics applicable to the user specific portion, and the first subset of heuristics being for executing a determination that the training user interacted with a resource associated with the POI, the resource including at least one of a telephone number associated with the POI, and a web site associated with the POI.

In some implementation of the method, the first subset of heuristics is being further for executing a determination that the training user interacted with a web resource and the interaction with the web resource included the training user executing a web search associated with the POI.

In some implementation of the method, the web resource is a map service and the interaction was a search in the map service for the POI, the search having been executed by the training user.

In some implementation of the method, the method further comprises determining, based on the training wireless device identifier: a set of time-stamped geo-tracked locations of the training wireless device, the set of time-stamped geo-tracked locations being indicative of locations where the training wireless device was located over a pre-determined period of time, and wherein the set of heuristics comprises a second subset of heuristics applicable to the device specific portion, and the second subset of heuristics being for executing a determination based on the set of time-stamped geo-tracked locations that the training user moved to within the pre-determined vicinity of the location of the POI.

In some implementation of the method, the second subset of heuristics is further for executing a determination that the training user was exposed to the targeted message associated with the POI before having moved to within the pre-determined vicinity of the location of the POI.

In some implementation of the method, the targeted message is an online targeted message.

In some implementation of the method, the targeted message is an offline targeted message.

In some implementation of the method, the second subset of heuristics further for executing a determination that the training user moved to within the pre-determined vicinity of the location of the POI within a pre-determined time limit after having been exposed to the targeted message.

In some implementation of the method, the pre-determined time limit is less than five hours.

In some implementation of the method, the pre-determined vicinity is defined by a radius of five hundred meters away from the location of the POI.

In some implementation of the method, the pre-determined vicinity is defined by a radius of one hundred and fifty meters away from the location of the POI.

In some implementation of the method, the second subset of heuristics is further being for executing a determination that the training wireless device connected, via the training communication module, to the local area network (LAN), and wherein the LAN is associated with the POI.

In some implementation of the method, the location is associated with a plurality of LANs, the plurality of LANs including the LAN, and wherein the training local area communication features include at least one of: a Service Set ID (SSID) of each LAN of the plurality of LANs, a MAC Address of a wireless access point associated with each LAN of the plurality of LANs, and a signal strength of the wireless access point associated with each LAN of the plurality of LANs.

In some implementation of the method, the method further includes executing a feature engineering routine prior to the training phase, the feature engineering routine determining a plurality of features that are part of the set of training local area communication features, the plurality of features to be weighed more heavily by the MLA than the rest of the set of training local area communication features during the training phase.

According to another aspect of the present technology, there is provided a method of determining a conversion rate of a targeted message associated with a POI, the method being executed at a server having a processor and a non-transient memory communicatively coupled to the processor, the non-transient memory storing processor-executable instructions thereon for executing the method.

The method includes determining during an in-use phase, by the server, a plurality of users that have been exposed to a targeted message associated with the POI within a first pre-determined time period, each user of the plurality of users using a wireless device having a local area communication module and a wireless device identifier associated with the local area communication module; receiving during the in-use phase, at the server based on the wireless device identifiers of the wireless devices of the plurality of users, a plurality of sets of local area communication features of the local area communication modules of the wireless devices; inputting, by the server into the MLA as an in-use input, the plurality of sets of local area communication features of the wireless devices; receiving, by the server from the MLA as an in-use output based on the plurality of sets of local area communication features of the wireless devices, a plurality of indications, a given indication of the plurality of indications being associated with a given user of the plurality of users and indicating whether the given user visited the POI within a second pre-determined time period after having been exposed to the targeted message; and determining during the in-use phase, by the server, based on the plurality of indications, a conversion rate parameter indicating the conversion rate of the targeted message, the conversion rate being a percentage of the plurality of users that have visited the POI within the second pre-determined time period after having been exposed to the targeted message.

According to another aspect of the present technology, there is provided a method of determining a Place Visit Lift (PVL) metric, the method being executed at a server having a processor and a non-transient memory communicatively coupled to the processor, the non-transient memory storing processor-executable instructions thereon for executing the method.

The method includes determining, by the server, a visitors_site parameter, the visitors_site parameter being equal to a number of users that both: a) were exposed to a targeted message directing users to a point of interest (POI), and b) visited the POI after having been exposed to the targeted message; determining, by the server, a bypassers_site parameter, the bypassers_site parameter being equal to a number of users that did not visit the POI after having been exposed to the targeted message; determining, by the server, a visitors_non-site parameter, the visitors_non-site parameter being equal to a number of users that were not exposed to the targeted message but visited the POI; determining, by the server, a bypassers_non-site parameter, the bypassers_non-site parameter being equal to a number of users that were not exposed to the targeted message and did not visit the POI; and determining, by the server, the PVL metric according to a formula:

$$PVL = \frac{visitors\_site/bypassers\_site}{visitors\_non\text{-}site/bypassers\_non\text{-}site} * 100\% - 100\%.$$

In some embodiments, at least one of the visitors_site, the bypassers_site, the visitors_non-site, and the bypassers_non-site parameters being determined using the method of determining a fact of a visit as described herein above.

In some embodiments, the targeted message is an online targeted message.

In some embodiments, the targeted message is an offline targeted message.

The above examples are non-limiting.

DESCRIPTION OF THE DRAWINGS

FIG. 2 depicts a log containing geo-location coordinates, the log having been generated or hosted by a wireless device of the system of FIG. 1.

DETAILED DESCRIPTION

Figure 1:
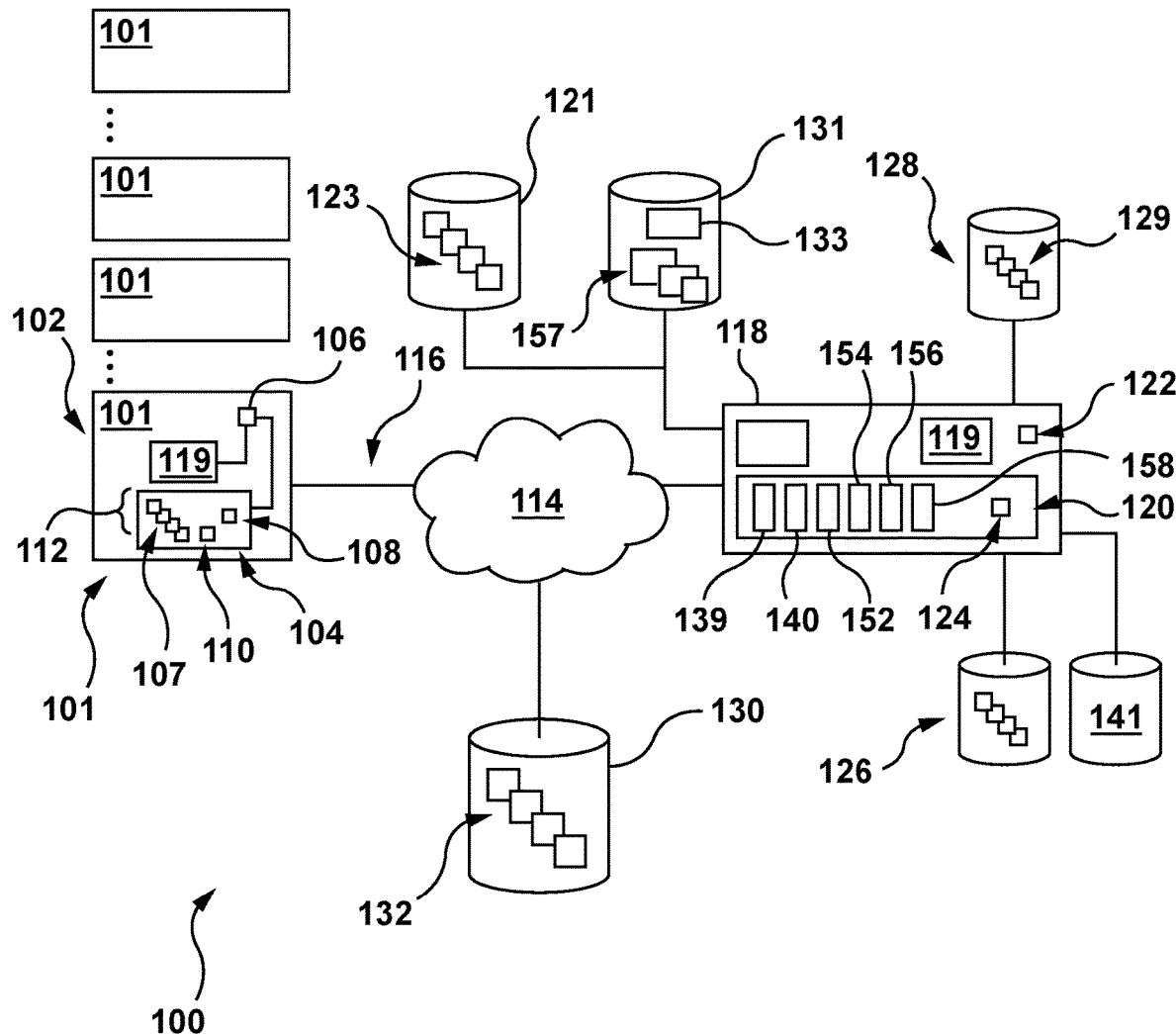
FIG. 1 depicts a schematic diagram of a system suitable for implementing non-limiting embodiments of the present technology.

Referring to FIG. 1, there is shown a schematic diagram of a system 100, the system 100 being suitable for implementing non-limiting embodiments of the present technology. It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology.

In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology.

As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labelled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared.

In some embodiments of the present technology, a processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

Referring to FIG. 1, the system 100 has access to a plurality of wireless devices 101. Some of the wireless devices 101 are shown in FIG. 1. The wireless devices 101 are similar to each other at least insofar as being suitable for use with the present technology. Therefore, only a representative one of the wireless devices 101, namely wireless device 102, is described herein in detail. The wireless device 102 is typically a portable wireless device that is associated with a user (not depicted) and, as such, can sometimes be referred to as a "client device". It should be noted that the fact that the wireless device 102 is associated with the user does not mean to suggest or imply any mode of operation—such as a need to log in, a need to be registered or the like.

In the context of the present specification, unless provided expressly otherwise, a "wireless device" is any portable wireless device having at least one kind of geo-location means for determining its own geo-location and at least having Wi-Fi connectivity capability to connect to local area networks (LANs) and/or other devices. Some non-limiting examples of wireless devices include Wi-Fi enabled and Global Positioning System (GPS) enabled smartphones and tablets that are typically carried around by their users wherever they go. It should be noted that a device acting as a wireless device in the present context is not precluded from acting as a server to other wireless devices. The use of the expression "a wireless device" does not preclude multiple client devices being used in receiving/sending, carrying out or causing to be carried out any task or request, or the consequences of any task or request, or steps of any method described herein.

The wireless device 102 comprises a permanent storage 104 storing processor-executable instructions therein, a processor 106 communicatively coupled to the permanent storage 104, and a local area communication module 109 communicatively coupled to the processor 106. The permanent storage 104 may encompass one or more storage media and provides a place to store computer-executable instructions executable by a processor 106. By way of an example, the permanent storage 104 may be implemented as a computer-readable storage medium including Read-Only Memory (ROM), hard disk drives (HDDs), solid-state drives (SSDs), and flash-memory cards. The local area communication module 109 in the present embodiment includes a Wi-Fi module capable of connecting to a local area network (LAN) that may be shared via a Wi-Fi access point such as a wireless router. In some embodiments, the local area communication module 109 also includes a Bluetooth™ module for Bluetooth connectivity.

The wireless device 102 further comprises hardware and/or software and/or firmware (or a combination thereof) to execute a plurality of applications 107, including a navigation application 108 stored at least in part in the permanent storage 104. One purpose of the navigation application 108 is to enable the user to navigate from one location to another location. The manner in which the navigation application 108 is implemented is known in the art and will not be described herein. For example, the navigation application 108 may be one of Yandex.Maps™, Yandex.Navigator™, or other commercial or proprietary map application.

The wireless device 102 also has access to a GPS receiver configured to receive GPS satellite signals and determine the geo-location of the wireless device 102, or other means of determining the geo-location of the wireless device 102 at given times and/or time intervals. In the present embodiment, the wireless device 102 includes the GPS receiver on-board. In at least some embodiments, the wireless device 102 does not need to be connected to the Internet, nor be executing the navigation application 108, to receive the GPS satellite signals, and as such the wireless device 102 may be configured to track the movement of user in the form of geo-locations that may be recorded in terms of latitude and longitude irrespective of the availability of the Internet connection. In the present embodiment, the wireless device 102 determines its GPS coordinates at a given frequency which depends on each particular embodiment of the wireless device 102 and its operating system for example, and records them in a log 110.

In some embodiments, the wireless device 102 stores the log 110 on-board, in the permanent storage 104. In some embodiments, the log 110 is stored remote to the wireless device 102, such as at a remote server. In some embodiments, the wireless device 102 makes its geo-location available to one or more remote servers. In some embodiments, the wireless device 102 makes its geo-location available to one or more remote servers in or near real-time.

In some non-limiting embodiments, the log 110 stores the geo-locations of the wireless device 102 as timestamped geo-location coordinates of the wireless device 102 that have been collected or provided by the wireless device 102 over time. In some embodiments, the wireless device 102 collects and in some cases hosts the log 110 and/or its timestamped GPS coordinates, such as via a combination of the applications 107 and/or via the operating system of the wireless device 102 without any particular application stored on the wireless device 102 being opened by a user thereof.

With reference to FIG. 2, a non-limiting embodiment of the log 110 is illustrated. The manner and format in which the log 110 is populated and stored is not limited. As an example, the wireless device 102 may be configured to receive the GPS satellite signals at predetermined time intervals, and convert the GPS satellite signals into time-stamped geo-location coordinates. In some embodiments, the wireless device 102 comprises and/or uses cell-tower triangulation or other geo-location determining means to obtain its geo-locations, either instead of or in addition to using a GPS system.

In the example shown in FIG. 2, the log 110 comprises a first geo-location coordinate 202 which corresponds to, for the sake of a non-limiting example, a MacDonald's™ 500 in a given geographical area 136. The first geo-location coordinate 202 is associated with a first timestamp 204. The first timestamp 204 corresponds to the time at which the wireless device 102 was at the first geo-location coordinate 202. The log 110 further comprises additional geo-location coordinates and associated time stamps (not separately numbered). For example, based on the time stamps and geo-location coordinates within the log 110, it could be understood that the wireless device 102 has moved 0.5 seconds north and 0.4 seconds west within 6 minutes. Only four geo-locations are illustrated in the log 110, to maintain clarity. The log 110 may comprise more or fewer geo-locations/coordinates.

In some embodiments, the wireless device 102 is configured to assign a user device ID 206 to the log 110. For example, the user device ID 206 may be a MAC address of the wireless device 102 or a component thereof, and/or may be an indication of a user name (such as an email address) associated with the user if the wireless device 102 requires the user signing-in, and so on. In another example, the user device ID 206 may correspond to a proprietary ID number assigned by, for example, the navigation application 108 and/or other service application(s) 112 (described below). The user device ID 206 is thus one example of a wireless device identifier 206 of the wireless device 102.

Referring back to FIG. 1, the wireless device 102 comprises hardware and/or software and/or firmware (or a combination thereof) to execute one or more service applications 112. In some embodiments, the one or more service applications 112 comprise at least one service application (not numbered) that is operated by the same entity that has provided the afore-described navigation application 108. For example, if the navigation application 108 is Yandex.Navigator, the one or more service applications 112 may include a web browser application Yandex.Browser™, a news application Yandex.News™, a market application Yandex.Market™, and the like. Needless to say, the one or more service applications 112 may also include service applications that are not operated by the same entity that has provided the afore-mentioned navigation application 108, and may comprise for example, social media applications such as Vkontakte™, and music streaming application such as Spotify™.

In some embodiments the activities of the user executed via the wireless device 102 are collected by one or more servers, and are used to build a profile of the user, or simply a user profile, associated with the user and/or the user's wireless device(s) 102. In some embodiments, the user profile comprises a user specific portion comprising information related to the user and a device specific portion comprising information related to the user's wireless device(s) 102. In some embodiments, the one or more service applications 112 that are operated by the same entity as the navigation application 108 are configured to report and/or store user activities and/or geo-locations with an accompanying indication of the unique user ID 206 or other means for allowing subsequent identification of the user's activity/geo-location history with the user's wireless device(s) 102 via which the user performed the actions constituting the user's activity history.

The wireless device 102 comprises a communication interface (not depicted) for enabling two-way communication with a communication network 114 via a communication link 116. In some non-limiting embodiments of the present technology, the communication network 114 can be implemented as the Internet. In other embodiments of the present technology, the communication network 114 can be implemented differently, such as any wide-area communication network, local area communications network, a private communications network and the like. In some embodiments, the communication interface includes and/or operates with the local area communication module 109 of the wireless device 102.

How the communication link 116 is implemented is not particularly limited and depends on how the wireless device 102 is implemented. Merely as an example and not as a limitation, in those embodiments of the present technology where the wireless device 102 is implemented as a wireless device (such as a smart phone), the communication link 116 can be implemented as a wireless communication link (such as, but not limited to, a 3G communications network link, a 4G communications network link, a Wireless Fidelity, or WiFi®, for short, Bluetooth®, or the like) or wired (such as an Ethernet based connection).

It should be expressly understood that implementations for the wireless device 102, the communication link 116 and the communication network 114 are provided for illustration purposes only. As such, those skilled in the art will easily appreciate other specific implementational details for the wireless device 102, the communication link 116, and the communication network 114. As such, by no means the examples provided hereinabove are meant to limit the scope of the present technology.

Still referring to FIG. 1, the system 100 further includes a server 118 coupled to the communication network 114. The server 118 can be implemented as a computer server. In an example of an embodiment of the present technology, the server 118 can be implemented as a Dell™ PowerEdge™ Server running the Microsoft™ Windows Server™ operating system. Needless to say, the server 118 can be implemented in any other suitable hardware and/or software and/or firmware or a combination thereof. In the depicted non-limiting embodiment of the present technology, the server 118 is a single server. In alternative non-limiting embodiments of the present technology, the functionality of the server 118 may be distributed and may be implemented via multiple servers.

The server 118 comprises a communication interface 119 structured and configured to communicate with various entities (such as the wireless devices 101, and other devices potentially coupled to the communication network 114) via the communication network 114. The server 118 comprises a non-transient memory 120 which comprises one or more storage media and generally provides a place to store computer-executable program instructions executable by a processor 122. By way of example, the memory 120 may be implemented as a tangible computer-readable storage medium including Read-Only Memory (ROM) and/or Random-Access Memory (RAM). The memory 120 may also include one or more storage devices in the form of, by way of example, hard disk drives (HDDs), solid-state drives (SSDs), and flash-memory cards.

In some embodiments, the server 118 can be operated by the same entity that has provided the afore-described navigation application 108. For example, if the navigation application 108 is a Yandex.Navigator, the server 118 can be operated by Yandex LLC of Lev Tolstoy Street, No. 16, Moscow, 119021, Russia. In alternative embodiments, the server 118 can be operated by an entity different from the one that has provided the aforementioned navigation application 108. It is noted that while the server 118 is described herein below in some non-limiting embodiments as being configured with a particular set of modules providing various combinations of functions, in alternative non-limiting embodiments the server 118 could be configured with a different set of modules and/or in at least partially a distributed manner, so long as the functionality described in this document is provided.

In accordance with some non-limiting embodiments of the present technology, the server 118 is configured to execute a digital content item selection application 124 (the "selection application 124"). The manner in which the selection application 124 is implemented is described in detail below.

Digital Content Item Database

To that end, the server 118 is communicatively coupled to a digital content item database 126. In alternative embodiments, the digital content item database 126 may be communicatively coupled to the server 118 via the communication network 114. Although the digital content item database 126 is illustrated schematically herein as a single entity, it is contemplated that the digital content item database 126 may be configured in a distributed manner.

The digital content item database 126 is populated with a plurality of digital content items (not separately numbered). The nature of each of the plurality of digital content item is not particularly limited. Broadly speaking, a digital content item may correspond to a targeted message relating to one or more points of interest (POI), and comprising one or more sentences, images, videos, etc.

Figure 3:
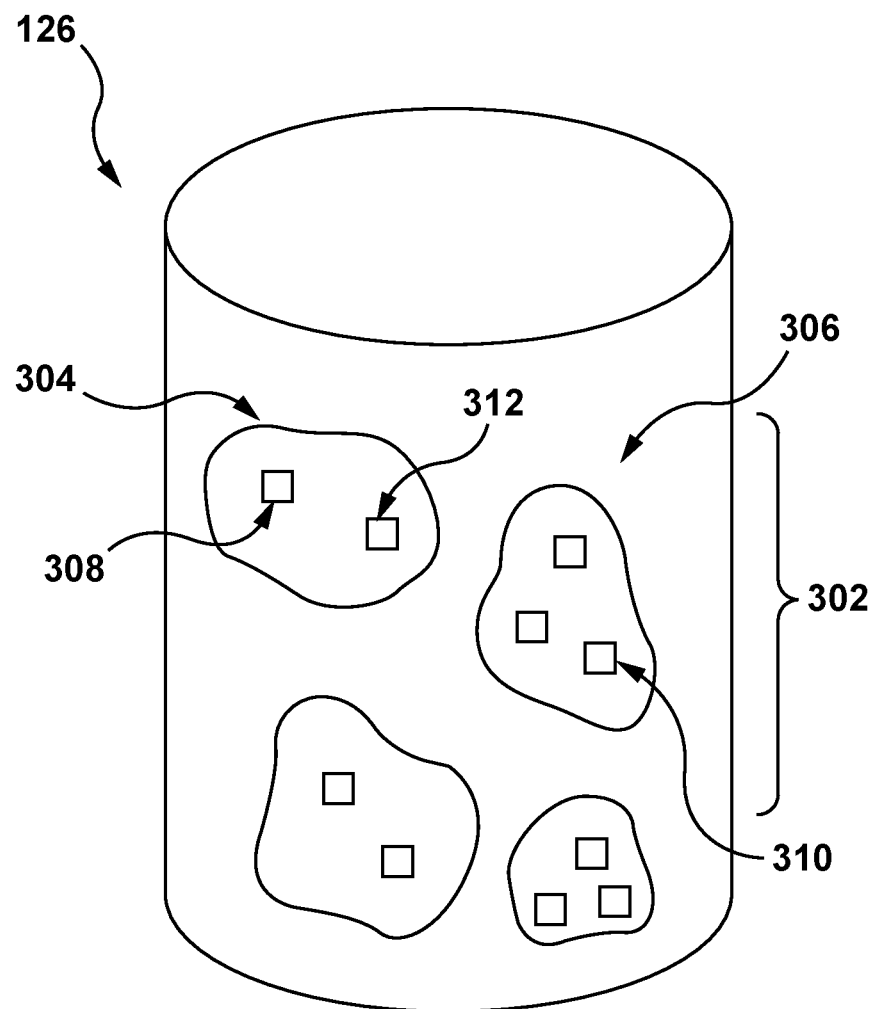
FIG. 3 depicts a digital content item database of the system of FIG. 1.

With reference to FIG. 3, a non-limiting embodiment of the digital content item database 126 populated with the plurality of digital content item is illustrated.

The manner in which the digital content item database 126 is populated is not limited. Just as an example the digital content item database 126 may receive the digital content items from one or more content providers.

In at least some non-limiting embodiments of the present technology, the digital content item database 126 can store the plurality of digital content items clustered into one or more topics. As such, the digital content item database 126 can be configured to execute a topic clustering routine (not depicted). The manner in which the plurality of digital content items are clustered into one or more topics or events is not limited, and may for example, be done using conventional clustering techniques, such as topic modelling or key word based approaches.

The plurality of digital content items is clustered into one or more topic clusters 302. For example, the digital content item database 126 stores a first topic cluster 304, a second topic cluster 306, a third topic cluster (not numbered) and a fourth topic cluster (not numbered). The first topic cluster 304 includes a first digital content item 308 and a second digital content item 312, and the second topic cluster 306 includes a third digital content item 310.

In some non-limiting embodiments of the present technology, the digital content item database 126 comprises additional information in respect to each of the plurality of digital content items, such as the duration of the digital content item, a minimum bidding price, target parameters selected by a source of the digital content item, indication of the digital content item being static or dynamic, and the like.

User Profile Database

With reference to FIG. 1, the server 118 is further in communication with a user profile database 128 that, inter alia, stores the user profiles 129 (described above) of the users of the wireless devices 101. In alternative non-limiting embodiments of the present technology, the user profile database 128 may be communicatively coupled to the server 118 via the communication network 114. Although the user profile database 128 is illustrated schematically herein as a single entity, it is contemplated that the user profile database 128 may be configured in a distributed or any other manner.

The user profile database 128 is a repository of the user profiles 129, each one of which is associated with one or more of the wireless devices 101. How the one or more user profiles 129 are stored is not limited, and may for example be a set of vectors representing the interests of a given user of one or more of the wireless devices 101.

Figure 4:
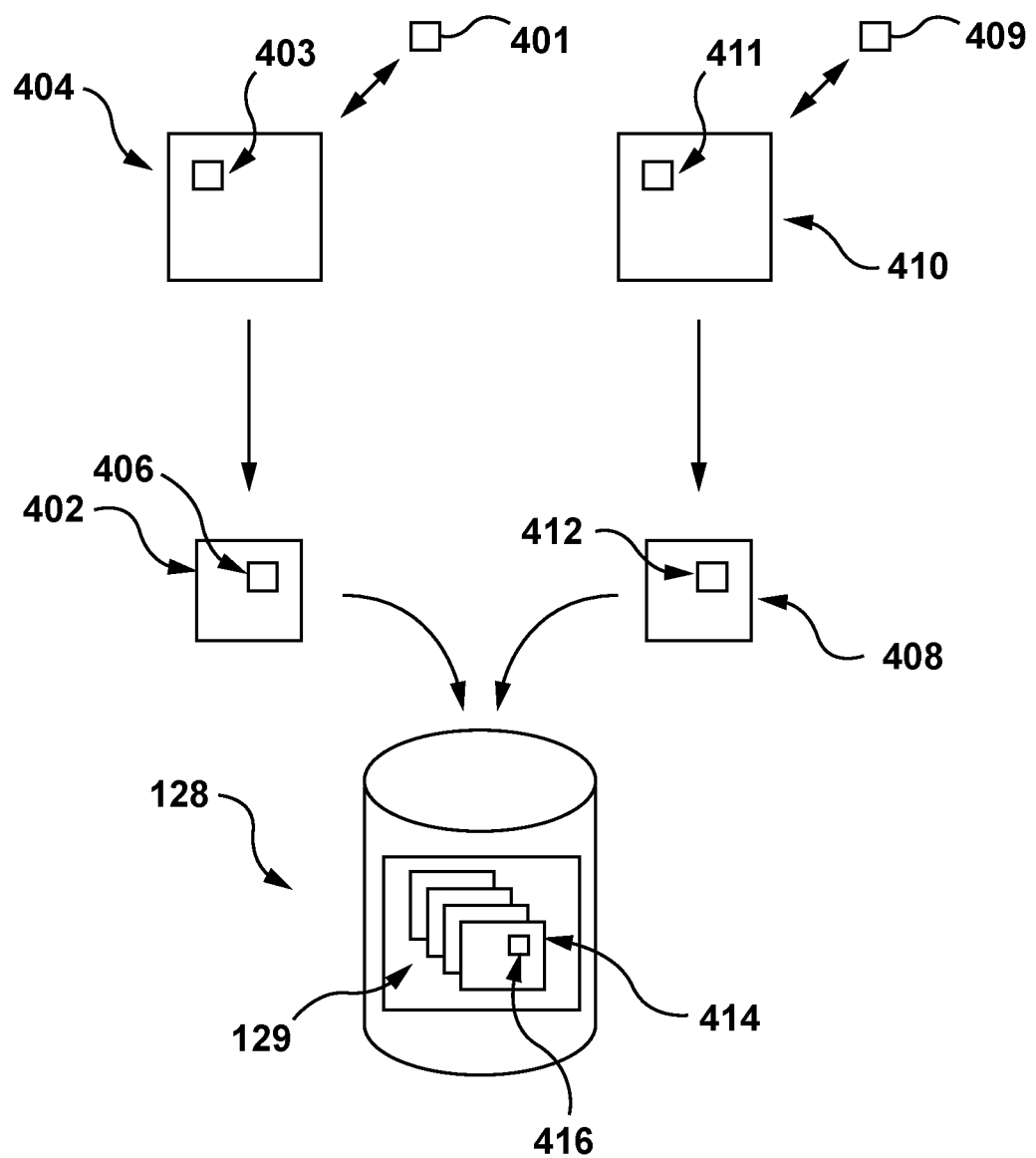
FIG. 4 depicts a user profile database of the system of FIG. 1.

With reference to FIG. 4, a schematic illustration of the aggregation of different user profiles associated with the user of the wireless device 102, the wireless device 102 being an example one of the wireless devices 101, is depicted.

A first profile 402 is received from a first service server 404. For example, the first service server 404 may be associated with a first service application 401 that corresponds to Yandex.Browser, which is operated by the same entity providing the aforementioned navigation application 108 on the wireless device 102. The first profile 402 may be generated by the first service server 404 based on for example the browsing logs 403 associated with the wireless device 102.

The first profile 402 is associated with a first unique ID 406, which is a proprietary user ID, associated with the wireless device 102. More particularly, and recalling that the first service application 401 is operated by the same entity providing the aforementioned navigation application 108 on the wireless device 102, the first unique ID 406 of the user's first profile 402 corresponds to the user device ID 206 of the wireless device 102.

A second profile 408 for the user of the wireless device 102 is received from a second service server 410. For example, the second service server 410 may be associated with a second service application 409 on the wireless device 102 that corresponds to Yandex.Market, which is operated by the same entity providing the aforementioned navigation application 108. The second profile 408 may be generated by the second service server 410 based for example on search logs 411 associated with searches executed by the user of the wireless device 102 via Yandex.Market on the wireless device 102.

The second profile 408 is also associated with a second unique ID 412. Given that Yandex.Market requires an email address to be provided by the user to access the digital service, the second unique ID 412 comprises both the email address of the user as well as the proprietary user ID, which corresponds to the user device ID 206.

In some non-limiting embodiments, the user profile database 128 is configured to execute a profile aggregation routine (not depicted). The profile aggregation routine is configured to determine if the first profile 402 and the second profile 408 correspond to the same user. For example, the profile aggregation routine may be configured to determine if the first unique ID 406 corresponds, at least partially, to the second unique ID 412.

If it is determined that the first unique ID 406 corresponds at least partially to the second unique ID 412, the profile aggregation routine is configured to aggregate the first profile 402 and the second profile 408 to generate an aggregated profile 414.

As a result of the execution of the profile aggregation routine, the user profile database 128 stores the aggregated profile 414 together with a third unique ID 416 (which corresponds to the user device ID 206 and the email address).

On the other hand, if the profile aggregation routine determines that the first unique ID 406 does not correspond even partially to the second unique ID 412, the first profile 402 and the second profile 408 are considered to be associated with different users. Consequently the user profile database 128 stores the first profile 402 (and the first unique ID 406) and the second profile 408 (and the second unique ID 412) separately.

Needless to say, although only two user profiles (the first profile 402 and the second profile 408) are illustrated to generate the aggregated profile 414, it should be understood that the aggregated profile 414 may be generated based on more than two user profiles for a given wireless device 101.

Moreover, although the aggregated profile 414 has been generated based solely on service applications that are operated by the same entity, it is not limited as such. Given that the second user profile 412 includes the email address associated with the user, it is possible to further aggregate the user's profile with a third user profile (not shown) that is received from a different entity, provided that the third user profile is also associated with a third unique ID that corresponds to the same email address.

In summary, the user profile database 128 stores a plurality of user profiles 129, with each of the user profiles 129 being associated with at least one of the wireless devices 101. In some non-limiting embodiments of the present technology, the user profiles 129 include additional information about the users to which they belong. One non-limiting example of such additional information is the users' genders. Another non-limiting example are the users' purchase histories.

Metrics Module

Referring back to FIG. 1, in some non-limiting embodiments, the server 118 stores in its memory 120 and executes a metrics module 139. The metrics module 139 retrieves timestamped geo-locations of the wireless devices 101 to which the server 118 has access, over a period of time. In some embodiments, the metrics module 139 retrieves the timestamped geo-location data continuously as the timestamped geo-location data becomes available on each given wireless device 101. The metrics module 139 stores the timestamped geo-location data of each given wireless device 101 with the associated unique ID of the given wireless device 101, in a user geo-location database 141. In some embodiments, the metrics module 139 further configures the user geo-location database 141 by associating therein the geo-location data of each given wireless device 101 with the corresponding user profile 402 and/or the unique user ID 206 or other corresponding unique identifier.

Figure 5:
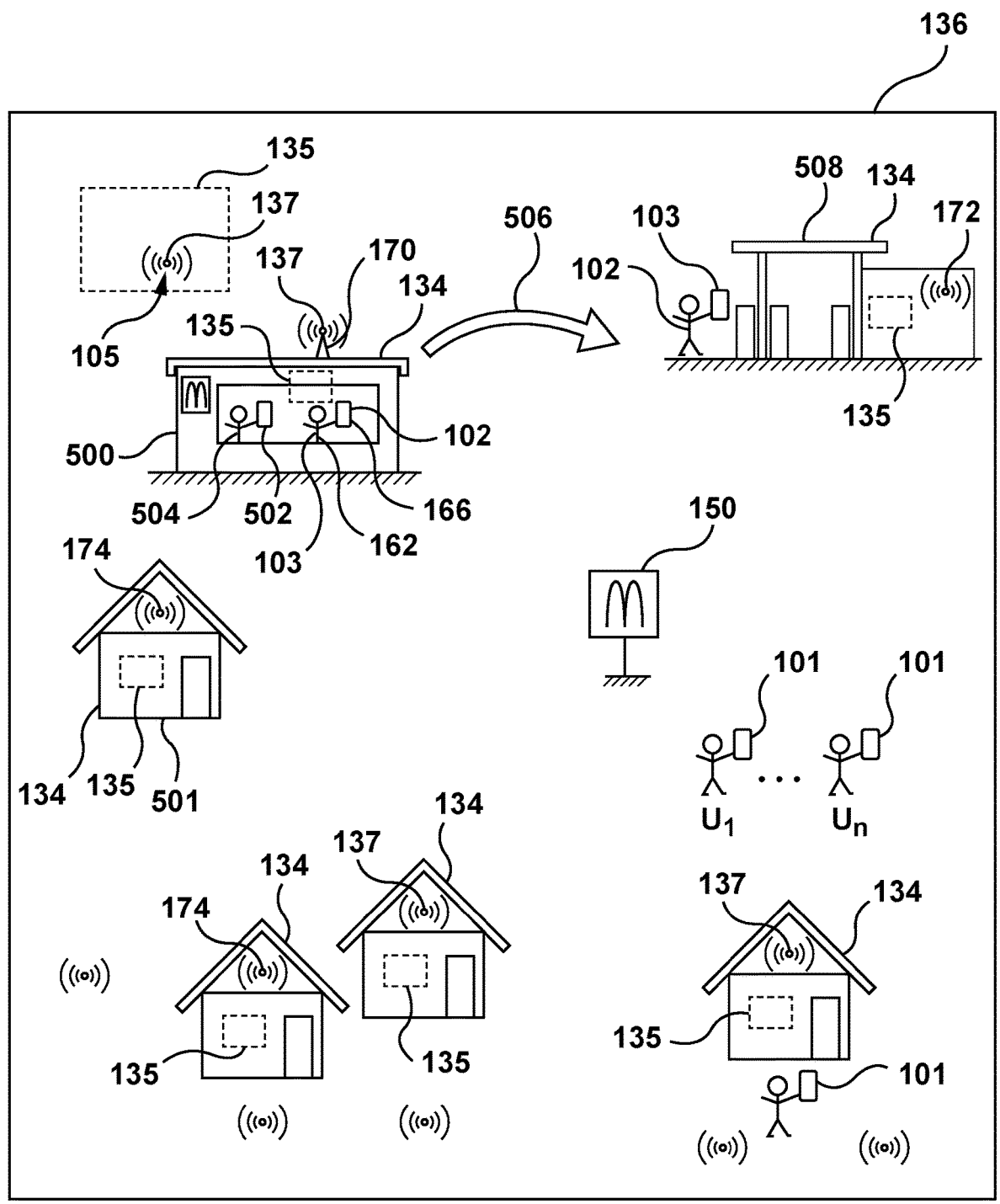
FIG. 5 depicts a non-limiting example of a geographical area, POIs in the geographical area, and users in the geographical area, each of the users having at least one wireless device.

Now also referring to FIG. 5, the metrics module 139 further retrieves from each given wireless device 101 information about LANs 135 that are detected by each given wireless device 101 at various geo-locations, at least at some given data collection frequency. The data collection frequency may be different for different wireless devices 101, and may be a function of the particular embodiment of each given wireless device 101 and/or each given wireless device's 101 operating system and/or configuration. As a non-limiting example, a given wireless device 101 may detect what LANs 135 are available at a frequency of ⅓ hertz, or once every three seconds.

As schematically shown in FIG. 5, a given LAN 135 may include a wireless access point 137 via which the given LAN 135 may be connected to by one or more wireless devices 101. As a non-limiting example, the wireless access point 137 may be a router. A given wireless device 101 may detect a wireless signal emanating from the wireless access point 137 of the LAN 135. Based on the wireless signal, each given wireless device 101 may determine all of: 1) a media access control address (MAC Address) of the wireless access point 137, 2) a Service Set ID (SSID) of the LAN 135, and 3) a strength of the wireless signal. In some embodiments, each given wireless device 101 may further derive additional metrics from the detected wireless signal which may be indicative of at least some characteristics of the wireless access point 137.

At any given geo-location, a given wireless device 101 may detect a plurality of wireless signals emanating from different wireless access points 137 that the given wireless device 101 may be in range of. The given wireless device 101 may derive the MAC Address, the SSID, and the signal strength for each of the detected wireless signals. As a non-limiting example, and still referring to FIG. 5, at a given point in time a given user 103 of a given wireless device 102 may be visiting the MacDonald's 500 in the geographical area 136. While the user 103 is inside the establishment, the user's 103 wireless device 102 may detect the following set of Wi-Fi's: 1) a LAN 135 that belongs to the MacDonald's 500 itself, 2) a LAN 135 in a residence 501 that is located in proximity to the MacDonald's 500; and 3) a LAN 135 shared via a Wi-Fi hotspot on a portable wireless device 502 of another user 504 that happened to be in the MacDonald's 500 at the same time as the user 103.

As another non-limiting example, after visiting the MacDonald's 500, the user 103 may decide to walk over, as shown with arrow 506, to a Petro-Canada™ gas station 508 that happens to be nearby. At the later corresponding time when the user 103 is at the gas station 508, the user's 103 wireless device 102 may detect a different set of Wi-Fi's: 1) a LAN 135 that belongs to the gas station 508, and 2) the LAN 135 that belongs to the MacDonald's 500 because the user is still in range thereof.

As shown in FIG. 5, when the user 103 is at the gas station 508, the user's 103 wireless device 102 is out of range of all of the residential LANs in the geographical area 136 and out of range of the Wi-Fi hotspot of the other user 504 because the other user's device 502 emits a weaker wireless signal than the wireless access point 137 belonging to the MacDonald's 500.

It will be appreciated that as the user 103 was walking from the MacDonald's 500 to the gas station 508, the user's 103 wireless device 102 may have detected additional, different, sets of LANs at the time frequency associated with the wireless device 102.

The MAC Address(es), the SSID(s) and the signal strength(s) detected by each given wireless device 101 at each given point in time, as well as the associated time of detection and any additional metric(s) that may be determined by the given wireless device 101, may be collectively referred to as: a timestamped LAN snapshot 123 (FIG. 1). The metrics module 139 may retrieve from each of the wireless devices 101 their timestamped LAN snapshots 123, for example at the time frequencies associated with each given wireless device 101, and store the LAN snapshots 123 in a LAN snapshot database 121 in a suitable data structure.

In some non-limiting embodiments, the metrics module 139 may retrieve the LAN snapshots 123 from all of the wireless devices 101 to which it has access in batches, at pre-determined time intervals for example. The server 118 may thus use the collected LAN snapshots 123 from all of the wireless devices 101 to generate the LAN snapshot database 121.

In some non-limiting embodiments, the metrics module 139 may be configured to filter at least some of the LANs out of the collected/stored LAN snapshots 123. For example, in some non-limiting embodiments, the server 118 and/or the metrics module 139 may be configured to determine/detect, for each given wireless device 101, which of the LANs by the given wireless device 101 at any point in time, or at least in a given number of sequential LAN snapshots 123, are static LANs and which are mobile/dynamic LANs.

The particular methods/algorithms used to discern and filter out mobile/dynamic LANs from static LANs are not limited. Any suitable methods/algorithms may be used for this purpose. The resulting filtered sequential LAN snapshots 123 are representative solely of static LANs. In at least some non-limiting embodiments, the static LANs snapshots 123 help establish more reliable fingerprints of POIs 134, as described below in more detail.

In some non-limiting embodiments, the metrics module 139 may be configured to delete from the LAN snapshot database 121, or simply initially not store in the LAN snapshot database 121, the MAC Address(es), the SSID(s), the signal strength(s), and any additional information related to any mobile/dynamic LANs determined to have been present in any of the LAN snapshot(s) 123.

Accordingly, in such non-limiting embodiments, the LAN snapshot database 121 may contain the information for only the static LANs by the wireless devices 101. One non-limiting example of a static LAN is a LAN 135 the SSID and the geo-location of which do not change at least over a pre-determined time period, such as a month. A non-limiting example of a mobile/dynamic LAN is a LAN the geo-location of which changes over a pre-determined time period, such as a day. A particular non-limiting example of a mobile/dynamic LAN is the LAN shared via the Wi-Fi hotspot on the portable wireless device 502 of user 504 in FIG. 5.

It is contemplated that additional and/or different definitions for the static LANs and/or the mobile/dynamic LANs could be used instead of or in addition to the abovementioned non-limiting examples thereof.

POI Databases

With reference to FIG. 1, the server 118 may be further in communication with a remote Point of Interest (POI) profile database 130 and a POI fingerprint database 131. In some non-limiting embodiments of the present technology, the remote POI profile database 130 may be communicatively coupled to the server 118 via a local connection or other direct link. In some non-limiting embodiments of the present technology, the POI fingerprint database 131 may be a remote database communicatively coupled to the server 118 via the communication network 114. Although the POI profile database 130 and the POI fingerprint database 131 are illustrated schematically herein as single entities, it is contemplated that one or both of the databases 130 and 131 may be implemented in a distributed manner.

In some non-limiting embodiments, the POI profile database 130 may store a plurality of POI profiles 132 of POIs 134 located in a given geographical area 136. A non-limiting example of a geographical area 136 and POIs 134 located therein are shown schematically in FIG. 5. The geographical area 136 may be for example, a given region in a country, a given city, a particular neighborhood of a city, a particular street, and so on. The POIs 134 may be, for example, businesses, services, landmarks, and so on. Some particular examples of POIs 134, as shown in FIG. 5, may include a MacDonald's 500 and a Petro-Canada gas station 508. The POI profile 132 of a given POI 134 may include, for example, hours of operation of the given POI 134, a category of the given POI 134, a geo-location of the given POI 134, a rating of the POI 134, and so on.

POI Fingerprint Module

Referring to FIG. 1, in some non-limiting embodiments, the server 118 may further store in its memory 120 and execute a POI fingerprint module 140. In summary, and as described in detail next, the POI fingerprint module 140 generates a POI fingerprint database 131 for the POIs 134 in the geographical area 136, based on at least a first subset of the LAN snapshots 123 captured/retrieved by the metrics module 139 over at least a first period of time and stored in the LAN snapshot database 121.

Once generated, the POI fingerprint database 131 stores at least one POI fingerprint 157 for each POI 134 in the geographical area 136. A POI fingerprint 157 of a given POI 134 is indicative of a typical set of LAN(s) 135, if any, and their associated characteristics, as they are typically detected by a given wireless device 101 of a user while the user is visiting the given POI 134. An example process implemented by the POI fingerprint module 140 is described next, in detail.

In some non-limiting embodiments, the POI fingerprint module 140 builds/defines the POI fingerprint database 131 to contain therein, for each user of each given one of the wireless devices 101, a dataset indicative of the POIs 134 that the user visited over a given timeframe, and the times at which the user made each of the visits. As described in more detail below, the POI fingerprint module 140 will then determine one or more LAN snapshots 123 that correspond to each determined visit to each given POI 134. The POI fingerprint module 140 will thereby determine a set of LAN snapshots 123 that occurred at different times and from different wireless devices 101 at each given one of the POIs 134. Based on each such set of LAN snapshots 123 for each given POI 134, the POI fingerprint module 140 will determine a fingerprint representative of the POI 134. This process is described in detail next.

The POI fingerprint module 140 accesses the user profile database 128 to obtain the user IDs 206, the user profiles 129, and the device identifiers of the corresponding wireless devices 101. Based on at least some of this information, the POI fingerprint module 140 may then identify the logs 110 of the corresponding wireless devices 101 and retrieve therefrom the geo-location data associated with the wireless devices 101 for at least a pre-defined timeframe, such as a given month, in the geographical area 136. The POI fingerprint module 140 may then access the POI profile database 130 and retrieve therefrom the profiles of the POIs 134 in the geographical area 136.

The POI fingerprint module 140 may then apply a set of heuristics to the abovementioned retrieved/determined data and thereby determine, for each given user-and-user-device combination, the particular ones of the POI(s) 134, if any, that the given user visited over the pre-defined timeframe and the time of each given visit.

As a non-limiting example, and referring to FIG. 5, the POI fingerprint module 140 may determine that the user 103 having the wireless device 102 visited the MacDonald's 500 from 12:00 pm to 12:10 pm on Nov. 29, 2018, from 1:00 pm to 2:00 pm on Nov. 31, 2018, and from 6:25 pm to 6:45 pm on Dec. 1, 2018. The POI fingerprint module 140 may also determine that another user 504 having a wireless device 502, visited the MacDonald's) 500 from 9:00 am to 10:00 am on Nov. 29, 2018, and from 1:30 pm to 2:30 pm on Nov. 30, 2018. The POI fingerprint module 140 may also determine a plurality of other visits by other users to the same establishment.

The POI fingerprint module 140 may in the same way determine a plurality of different visits by a plurality of different users to different POIs 134 in the geographical area 136. Suffice it to say that the POI fingerprint module 140 performs similar steps for the visits by the other users. To maintain simplicity, the present example continues with a discussion only of the user 103 and the associated steps of the POI fingerprint module 140.

Thus, using the user 103 as an example of one of the many users with regard to which the POI fingerprint module 140 determines facts of visits, the POI fingerprint module 140 may determine a plurality of timestamped geo-locations in the log 110 of the wireless device 102 of the user 103 that are representative of each of the three visits to the MacDonald's 500. For example, for the first visit, the POI fingerprint module 140 may determine two hundred timestamped geo-locations reported by the wireless device 102 of the user 103 that are associated with the first visit, if the wireless device 102 was at the time reporting its geo-location at a frequency of ⅓ hertz (Hz).

Set of Heuristics

To enable the abovementioned determinations of facts and times of visits by the different users to the different POIs 134, the set of heuristics comprises a first subset of heuristics applicable to the user specific portion of each given user profile 129. In some embodiments, the first subset of heuristics is configured for executing a determination that the relevant user interacted with a resource associated with a given POI 134.

The resource associated with a given POI 134, in some non-limiting embodiments, may include at least one of a telephone line associated with the POI 134, and a website associated with the POI 134. The website is one example of a web resource associated with the POI 134. Other examples of web resources are a map service. For the MacDonald's 500 visit example above, the telephone line may be a telephone line of the particular location of the MacDonald's 500, the website may be the MacDonald's general website, and the map service may be the navigation application 108 of the user's 103 wireless device 102.

In some non-limiting embodiments, the set of heuristics is further configured for executing determinations of when a given user of a given one of the wireless devices 101 interacted with a web resource of a given POI 134, and when the interaction included the user executing a web search associated with the POI 134. In the example of the MacDonald's 500, the first subset of heuristics may determine that the user 103 executed a search for the location of the MacDonald's 500 via the navigation application 108 of the wireless device 102 and that the user 103 subsequently arrived in a pre-defined vicinity of the location of the MacDonald's 500.

In the example of the user's 103 visiting the gas station 508, the first subset of heuristics may determine that the user 103 searched for a product, such as an energy drink, via a search engine executing on the wireless device 102, that the search engine returned an indication that the product is available at the gas station 508, and that the user's 103 geo-track in the associated timeframe was directed toward the gas station 508. It is contemplated that the first subset of heuristics may render its determinations of visits further based on other combinations of satisfied conditions.

In some non-limiting embodiments, the set of heuristics may further comprise a second subset of heuristics applicable to the device specific portion of the user profile 129 associated with each given wireless device 101 of each given user. The second subset of heuristics may be applicable to a set of timestamped geo-tracked locations of each given wireless device 101 that are indicative of locations where the given wireless device 101 was located over a pre-determined period of time. More particularly, the POI fingerprint module 140 may apply the second subset of heuristics to the set of timestamped geo-tracked locations of a given wireless device 101 and thereby execute a determination that the user of the given wireless device 101 moved to within a pre-determined vicinity of the location of the POI 134.

In the case of the user's 103 visits to the MacDonald's 500, the POI fingerprint module 140 may thereby execute a determination that the user 103 of the wireless device 102 moved to within, and remained within, the pre-determined vicinity, let's say 150 meters, of the location of the MacDonald's 500 during the times associated with each visit. That is, from 12:00 pm to 12:10 pm on Nov. 29, 2018, from 1:00 pm to 2:00 pm on Nov. 31, 2018, and from 6:25 pm to 6:45 pm on Dec. 1, 2018.

Further, in some non-limiting embodiments, the second subset of heuristics is configured for executing a determination that a given user was exposed to a targeted message associated with a given one of the POIs 134 before having moved to within the pre-determined vicinity of the location of a given one of the POI 134. In some non-limiting embodiments, the targeted message may be an online message. In the example of the MacDonald's 500, an online targeted message may be an indication that a deal is available for one of the products offered at the MacDonald's 500, the indication of the deal having been delivered to the wireless device 102 of the user 103.

In some non-limiting embodiments, the targeted message may be an offline message. In the example of the MacDonald's 500, an offline message may be an indication that the deal is available for one of the products offered at the MacDonald's 500, the indication of the deal having been delivered to the attention of the user 103 via a billboard 150 (FIG. 5) located in the geographic area 136.

In some non-limiting embodiments, the second subset of heuristics is further configured for executing a determination that a given user moved to within the pre-determined vicinity of the location of a given POI 134 within a pre-determined time limit after having been exposed to a targeted message associated with the given POI 134.

As an example, in some non-limiting embodiments, the pre-determined time limit programmed into the second subset of heuristics may be five hours. In some non-limiting embodiments, the pre-determined vicinity may be defined by a radius of five hundred meters away from the location of a given POI 134. In some non-limiting embodiments, the pre-determined vicinity may be defined by a radius of one hundred and fifty meters away from the location of a given POI 134.

In the example of the user's 103 visiting the gas station 508, the second subset of heuristics may determine that an advertisement (targeted message) for an energy drink available at the gas station 508 was delivered to the user's wireless device 102. The second subset of heuristics may further determine that the user 103, within 30 minutes of being exposed to the advertisement, moved to within a 150 meters of the gas station 508. Accordingly, based on this combination of determinations, the second subset of heuristics may render a determination that the user 103 visited the gas station 508.

In some such non-limiting embodiments, the facts of exposure and associated times of exposure of identified users to a given one or more identified targeted messages, including online targeted messages and offline targeted messages, may be determined by the server 118 using the technology described in a co-owned U.S. patent application Ser. No.: 16/739,668, filed on Jan. $10^{th}$ 2020 by the same applicant, entitled "METHOD AND SYSTEM FOR PROVIDING A RECOMMENDED DIGITAL CONTENT ITEM", bearing an attorney docket number 40703-128, and incorporated herein by reference in its entirety. It is contemplated that other methods of determining exposure times of users to targeted messages could also be used.

In some non-limiting embodiments, the second subset of heuristics is further configured for executing a determination that a given wireless device 101 connected, via the local area communication module 109 thereof, to a LAN 135 associated with the location of a given POI 134 and/or with the given POI 134 itself. In the example of the gas station 508 being visited by the user 103, the second subset of heuristics may determine that after arriving within the 50 meters of the gas station 508, the user 103 connected to the LAN 135 of the gas station 508 via her wireless device 102.

In summary, the set of heuristics enables the POI fingerprint module 140 to determine facts and times of visits by identified users to identified ones of the POIs 134. In at least some non-limiting embodiments, the POI fingerprint module 140 stores indications of the determined visits and/or times in the POI fingerprint database 131.

Once a first set of facts of visits by different users to each of the POIs 134 in the geographical area 136 are determined, the POI fingerprint module 140 retrieves the LAN snapshots 123 that correspond to each of the first set of facts and times of visits.

More particularly, in some non-limiting embodiments, over a pre-determined timeframe, for each given POI 134 and for each determined pair of: i) fact of visit, and ii) time of visit to that given POI 134, by a given wireless device 101 during the pre-determined timeframe, the POI fingerprint module 140 retrieves from the LAN snapshot database 121 the timestamped LAN snapshot 123 of the given wireless device 101. In other words, the POI fingerprint module 140 retrieves a dataset that is indicative of the LANs 135 and their corresponding metrics that were detected/determined by users' wireless devices 101 at each of the times of the visits by the users to each of the respective ones of the POIs 134.

Thus, for each given POI 134, the POI fingerprint module 140 may determine a plurality of timestamped LAN snapshots 123 that correspond to different times and/or different visits to the given POI 134. The plurality of timestamped LAN snapshots 123 may show different variations of LANs 135 (if any) and/or their associated metrics, as detected/determined by the wireless devices 101 at the associated times.

As a non-limiting example, during the visit between 12:00 pm and 12:10 pm on November 29 by the user 103 to the MacDonald's 500, the user's 103 wireless device 102 may have reported two hundred timestamped LAN snapshots 123, if the wireless device 102 was reporting timestamped LAN snapshots 123 at a time frequency of ⅓ Hz. Understandably, this particular example of the frequency is given for illustration purposes only, and may differ. The two hundred timestamped LAN snapshots 123 may show variations of, for example, signal strengths and different sets of SSID's and MAC Addresses, as these may have been detected by the wireless device 102 over the ten minute period of the visit.

POI Fingerprints

Once the sets of LAN snapshots 123 have been determined for each given POI 134, the POI fingerprint module 140 may determine a POI fingerprint 157 for each POI 134. To this end, for each given POI 134 the POI fingerprint module 140 may execute a statistics module that may average out the variations in the various metrics represented by the timestamped LAN snapshots 123 corresponding to that given POI 134. This statistics module may be implemented using any suitable known technology. The POI fingerprint module 140 may thereby produce a POI fingerprint 157 for each given POI 134.

The POI fingerprint 157 of a given POI 134 may be indicative of the typical LAN(s) 135, if any, that should be determined by a given wireless device 101 at any given time from the location of the given POI 134. In at least some non-limiting embodiments, a given POI fingerprint 157 of a given POI 134 is a statistical average of all LAN snapshots 123 that were determined to have been taken by a user while visiting the given POI 134.

In some non-limiting embodiments, the statistics module of the POI fingerprint module 140 may further determine additional statistics and/or metrics that could be expected to be detected/determined by a given wireless device 101 at any given time from the location of the given POI 134. In some such embodiments, the additional statistics and/or metrics could form part of the POI fingerprint 157 of the given POI 134. For example, in some non-limiting embodiments, the additional statistics and/or metrics may include weighted percentages of visitors/users the wireless device(s) 101 of which detected given ones of the LANs at each given one of the POIs 134. As another example, the additional statistics and/or metrics may include indications of signal strength dispersion from the location of each given one of the POIs 134.

In some non-limiting embodiments, the POI fingerprint module 140 generates multiple POI fingerprints 157 for each POI 134 in the geographic area 136. In some such embodiments, each of the POI fingerprint 157 corresponds to a particular given timeframe on a given day. In some such embodiments, each of the POI fingerprint 157 corresponds to a particular given timeframe on a particular given day of any given week. In some such embodiments, each of the POI fingerprint 157 corresponds to a particular given timeframe on a particular given day of a particular given week of the year. In other words, in at least some such non-limiting embodiments, the POI fingerprints 157 provide the LAN landscapes of the different POIs 134 as a function of time. In some such embodiments, the POI fingerprints 157 may be relatively more accurate.

Once the POI fingerprints 157 have been generated for the POIs 134 in the geographical area 136, the server 118 may execute a feature engineering routine. The feature engineering aspect of the present technology are described next.

Feature Engineering Module

Referring to FIG. 1, in some non-limiting embodiments, the server 118 further stores in its memory 120 and executes a feature engineering module 152. The feature engineering module 152 is configured to execute a feature engineering routine to determine those of the metrics of the POI fingerprints 157 that distinguish visits to a first POI from visits to a second POI. These metrics may be referred to as "more significant features" that are more indicative of the fact of a visit to a given POI.

More particularly, in some non-limiting embodiments of the present technology, the feature engineering module 152 determines the more significant features by comparing the POI fingerprints 157 to each other to determine differences therebetween. The feature engineering module 152 then applies a set of statistics to the determined differences between the POI fingerprints 157 to determine trends therein and thereby derives the more significant features pertaining to each given location in the geographical area 136. It is contemplated that any suitable set of statistics configured to find trends in data for example, could be used for this purpose. It is also contemplated that in some embodiments, the feature engineering module 152 and its associated steps could be omitted.

Training Dataset Generating Module

The server 118 further stores in its memory 120 and executes a training dataset generating module 154. In summary, and as described in detail below, the training dataset generating module 154 generates the training dataset that is then fed to a Machine Learning Algorithm (MLA) 158 to train the MLA 158 to determine a fact of a visit to a POI 134 based on a given LAN snapshot 123 as detected by a given wireless device 101.

To generate the training dataset, the training dataset generating module 154 retrieves the identities of a previously-unused set of the wireless devices 101 associated with the geographical area 136 to obtain previously-unused geo-tracks therefrom. In some embodiments, the training dataset generating module 154 retrieves a previously-unused geo-tracks of at least some of the same wireless devices 101 that may have been used in generating the POI fingerprints 157. Previously-unused with respect to wireless devices 101 means that the wireless devices 101 have not been used by the server 118 in generating the POI fingerprints 157. Previously-unused with respect to geo-tracks means that the geo-tracks have not been used by the server 118 in generating the POI fingerprints 157. In at least some cases, using previously-unused wireless devices 101 and/or previously-unused geo-tracks thereof improves the in-use accuracy of the MLA 158 that will be trained as described in detail herein below.

This new, previously unused, set of timestamped geo-tracks is referred to as a training set of timestamped geo-tracks, with each given training set of timestamped geo-tracks including a plurality of timestamped geo-locations of the corresponding wireless device 101. Those of the wireless devices 101 from which the training set of timestamped geo-tracks have been obtained are referred to as training wireless devices 101.

For each given timestamped geo-location of a given training wireless device 101, the training dataset generating module 154 retrieves from the LAN snapshot database 121 described above a timestamped LAN snapshot 123 the timestamp of which corresponds to the timestamp of the given timestamped geo-location. In other words, the training dataset generating module 154 determines what LANs and corresponding metrics, if any, were detected by the given training wireless device 101 at the given timestamped geo-location.

The training dataset generating module 154 determines which of the POIs 134, if any, are located within a pre-determined vicinity of each given timestamped geo-location of each given training geo-track of each training wireless device 101. In some non-limiting embodiments, the pre-determined vicinity is defined by a radius of 60 meters centered about the corresponding timestamped geo-location. In other non-limiting embodiments, the radius is different. It is contemplated that the radius could be pre-determined based on an accuracy of each given corresponding timestamped geo-location. It is contemplated that the radius could be pre-determined for each given wireless device 101, both in the training phase and in an in use phase, based on the geo-locational accuracy of that given wireless device 101.

Where the training dataset generating module 154 determines that none of the POIs 134 are located within the pre-determined vicinity of a given timestamped geo-location, the training dataset generating module 154 labels the timestamped LAN snapshot 123 corresponding to the given timestamped geo-location with a label indicating that none of the POIs 134 is being visited.

On the other hand, where the training dataset generating module 154 determines that at least one of the POIs 134 are located within the pre-determined vicinity of a given timestamped geo-location, the training dataset generating module 154 applies the set of heuristics, as described herein above, to determine whether or not one of the at least one of the POIs 134 is being visited by the user of the corresponding training wireless device 101 at the time corresponding to the timestamp of the geo-location. The training dataset generating module 154 then labels the timestamped LAN snapshot 123 corresponding to the given timestamped geo-location with a label indicating a result of the determination by the set of heuristics. Such labels may be referred to as training labels.

Thus, in some non-limiting embodiments, where the set of heuristics returns a positive determination for a given one of the POIs 134, the training dataset generating module 154 labels the timestamped LAN snapshot 123 corresponding to the given timestamped geo-location with a training label indicating the name of the POI 134 determined as being visited. In some non-limiting embodiments, the training label may include a name of the POI 134 being visited and a probability of the POI 134 being visited. In some non-limiting embodiments, the training label may further include names of other POIs 134 in the pre-determined vicinity and corresponding probabilities of those other POIs 134 being visited.

The dataset resulting from the above determination and labeling steps is referred to as an MLA training dataset, and is used to train an MLA 158 to determine/predict facts of visits by a given user of a given wireless device 101 based on a LAN snapshot 123 detected by the given wireless device 101 at a given point in time. The training phase is described in detail next.

MLA Training Module

The server 118 further stores in its memory 120 an MLA training module 156, and an MLA 158, such as a neural network type MLA, or a Gradient Boosting type MLA. The MLA training module 156 feeds the MLA training dataset to the MLA 158 to train the MLA 158.

More particularly, in the training phase, the MLA training module 156 may input into the MLA 158 each given training LAN snapshot 123 and may designate the training label corresponding to the training LAN snapshot 123 as the corresponding output of the MLA 158. In this sense, each given training LAN snapshot 123 provides a training set of local area communication features for the MLA 158.

In some non-limiting embodiments, during the training phase, the MLA training module 156 conditions the MLA 158 to weigh the more significant features of each given training LAN snapshot 123 more heavily in making a determination of a visit than other features of the given training LAN snapshot 123. It is contemplated that in some embodiments, this conditioning step could be omitted.

In some embodiments, the MLA 158 is trained to output a name or other identifier of a given POI 134 being visited for positive determinations, and an indication that none of the POIs 134 is being visited for negative determinations.

In some embodiments, the MLA 158 may be trained to output a ranked list of identified POIs 134, in which list each of the POIs 134 is provided with an indication of a probability, the probability indicating that a corresponding user is visiting that particular one of the POIs 134. The list may be ranked from a most-probably visited one of the POIs 134 to a least-probably visited one of the POIs 134.

Once the MLA 158 is sufficiently trained and with the server 118 and system 100 structure described above, various methods can now be practiced. These methods are described next.

Method of Determining a Visit to a POI

Figure 6:
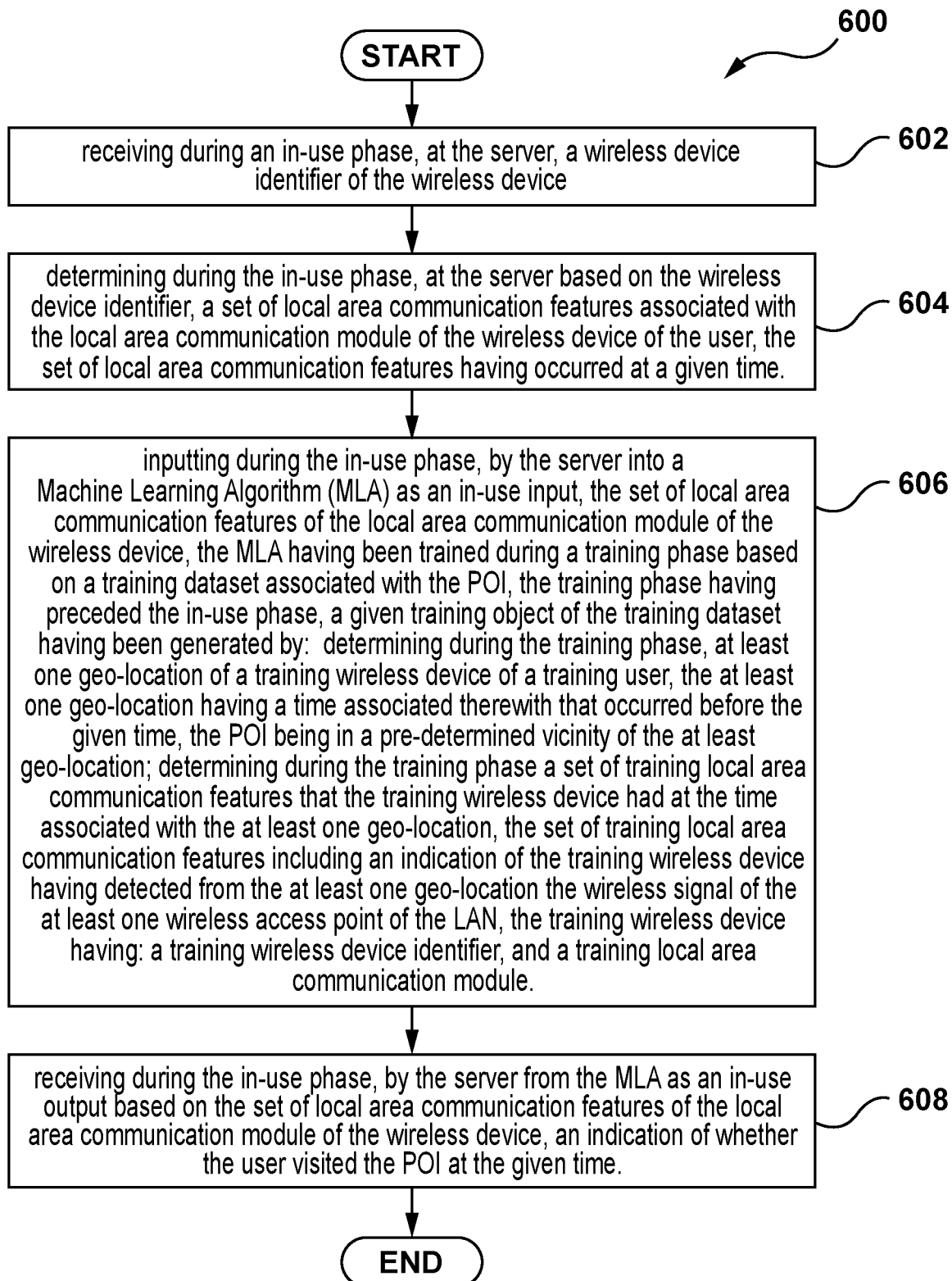
FIG. 6 depicts a logic flow diagram showing a non-limiting embodiment of a method according to the present technology.

Now referring to FIG. 6, in some non-limiting embodiments of the present technology, there is provided a method 600 of determining a fact of a visit of a user to a point of interest (POI) 134, the user using a wireless device having a local area communication module 109, the POI 134 being in a location, the location being associated with a local area network (LAN), the LAN including at least one wireless access point 137 broadcasting a wireless signal.

In some non-limiting embodiments, the method 600 is executed at the server 118 having a processor 122 and a non-transient memory 120 communicatively coupled to the processor 122, the non-transient memory 120 storing processor-executable instructions thereon for executing the method 600. One example of a server suitable for executing the method 600 is the server 118, as described above. Accordingly, for simplicity and not to be limiting, the method 600 will be described with regard to the server 118.

Step 602—receiving during an in-use phase, at the server, a wireless device identifier of the wireless device.

In one embodiment, the method 600 starts at step 602, which includes receiving during an in-use phase, at the server 118, a wireless device identifier 206 of the wireless device 101 for which the method 600 will determine a fact of a visit to a given POI 134.

As a non-limiting example, and referring to FIG. 5, let's assume that the server 118 receives the wireless device identifier 206 of a wireless device 166 that is being used by a user 162. As described above, one example of the wireless device identifier 206 is the user device ID 206.

Let's assume that a given POI 134 for which a fact of a visit by the user 162 is to be determined is the MacDonald's 500 in the geographical area 136. It is noted that to maintain simplicity, the user 162 is shown with the same figurine as the user 103 described above. It will be appreciated, however, that in the present example the user 162 is different from the user 103 described above.

Step 604—determining during the in-use phase, at the server based on the wireless device identifier, a set of local area communication features associated with the local area communication module of the wireless device of the user, the set of local area communication features having occurred at a given time.

In one embodiment, the method 600 may proceed with determining, during the in-use phase, at the server 118 based on the wireless device identifier 206, a set of local area communication features associated with the local area communication module 109 of the wireless device 166 of the user 162, the set of local area communication features having occurred at a given time.

In some non-limiting embodiments, for each occurrence of an execution of the method 600, the given time is the time as of which the method 600 is to determine whether or not a given user is visiting a given POI 134.

Let's assume that the user 162, having the wireless device 166, enters the MacDonald's 500 on Dec. 4, 2018, at 10:43 am Eastern Time (US & Canada), as shown in FIG. 5.

For this given time, in some non-limiting embodiments, the server 118 retrieves based on the wireless device identifier 206, the LAN snapshot 123 as detected by the local area communication module 109 (in the present non-limiting example, a Wi-Fi module) of the wireless device 166 at the given time.

Thus, in the present example, the LAN snapshot 123 retrieved by the server 118 thus includes the LANs 135 as detected by the wireless device 166 from inside the MacDonald's 500 at 10:43 am Eastern Time on Dec. 4, 2018. As an example, at 10:43 am on Dec. 4, 2018 the wireless device 166 at this time could have detected: 1) the LAN 135 that belongs to the MacDonald's 500 itself, 2) the LAN 135 in the residence 501 that is located in proximity to the South East of the MacDonald's 500; and 3) a Wi-Fi 172 provided by the Petro-Canada gas station 508 located nearby to the North East.

In the present non-limiting embodiment and example, the wireless device 166 detected, for each of the above Wi-Fi's at least an SSID, a MAC address of the corresponding wireless access point 137 and/or LAN 135, and a signal strength of the wireless signal of the corresponding wireless access point 137. This determined data thus forms at least part of the set of local area communication features for input to the MLA 158.

Step 606—inputting during the in-use phase, by the server into a Machine Learning Algorithm (MLA) as an in-use input, the set of local area communication features of the local area communication module of the wireless device, the MLA having been trained during a training phase based on a training dataset associated with the POI, the training phase having preceded the in-use phase, a given training object of the training dataset having been generated by: determining during the training phase, at least one geo-location of a training wireless device of a training user, the at least one geo-location having a time associated therewith that occurred before the given time, the POI being in a predetermined vicinity of the at least geo-location; determining during the training phase a set of training local area communication features that the training wireless device had at the time associated with the at least one geo-location, the set of training local area communication features including an indication of the training wireless device having detected from the at least one geo-location the wireless signal of the at least one wireless access point of the LAN, the training wireless device having: a training wireless device identifier, and a training local area communication module.

In one embodiment, the method 600 may proceed with inputting, during the in-use phase, by the server 118 into a Machine Learning Algorithm (MLA), such as the MLA 158, as an in-use input, the set of local area communication features (SSIDs, MAC Addresses, signal strengths, etc.) determined by the wireless device 166 of the user 162 at the first given time.

In the present part of the example, the set of local area communication features inputted into the MLA 158 therefore includes at least the SSID, the MAC address, and the signal strength of each of: 1) the LAN 135 that belongs to the MacDonald's 500, 2) the LAN 135 in the residence 501; and 3) the Wi-Fi 172 provided by the Petro-Canada gas station 508.

It is contemplated that in some embodiments, only the SSID and the signal strength could be used. It is also contemplated that in some embodiments, only the MAC address and the signal strength could be used. In some non-limiting embodiments, POIs 134 within a pre-defined vicinity of the geo-location associated with each given set of local area communication features are determined, similar to how this determination was described above.

In some non-limiting embodiments, at this stage, the MLA 158 had been correspondingly trained as described above during a training phase based on a training dataset associated at least with the given POI 134, and in some cases with all POIs 134 in the geographical area 136. The creation of the training dataset was described above, and will not be repeated here in detail.

Step 608—receiving during the in-use phase, by the server from the MLA as an in-use output based on the set of local area communication features of the local area communication module of the wireless device, an indication of whether the user visited the POI at the given time.

In one embodiment, the method 600 may proceed with receiving during the in-use phase, by the server 118 from the MLA 158 as an in-use output based on the set of local area communication features of the local area communication module 109 of the wireless device 166, an indication of whether the user 162 visited the POI 134 at the given time.

In the present example, the MLA 158 therefore outputs an indication that the user 162 is visiting the MacDonald's 500. In some embodiments, the indication includes a name and/or address and/or other identifier(s) of the particular POI 134 determined to be visited. Thus, in the above example, the indication may simply be: MacDonald's 500, Address: XYZ.

In some embodiments, the MLA 158 outputs a ranked list of potential POIs 134 being visited, of the POIs 134 in a pre-determined vicinity of the user's 162 geo-location. In some embodiments, the rank list includes a "Yes" or a "No" indication next to each of the POIs 134 on the list, and the POIs 134 that are more likely to be visited are listed higher than the rest of the POIs 134 on the list. In some such embodiments, in the above example, the ranked list may indicate: 1) MacDonald's 500, "YES", Address: XYZ.; 2) Petro-Canada, "NO", Address: XYZ.

In other embodiments, the ranked list may indicate a probability of a visit to each of the POIs 134 on the ranked list. Thus, in the above example, the ranked list may indicate: 1) MacDonald's 500, 86% (probability of visit), Address: XYZ; 2) Petro-Canada, 14% (probability of visit), Address: XYZ.

Understandably, the steps 602 to 608 of the method 600 may be executed with respect to each geo-location reported by the user's 162 wireless device 166. Each new LAN snapshot 123 corresponding to each new reported geo-location may be inputted into the MLA 158 as a new set of local area communication features.

The above example is given with respect to tracking POI visits of a single user. However, the method 600 may also be used to track and determine POI visits of a plurality of users to any one of the POIs 134 in the geographical area 136.

Figure 7:
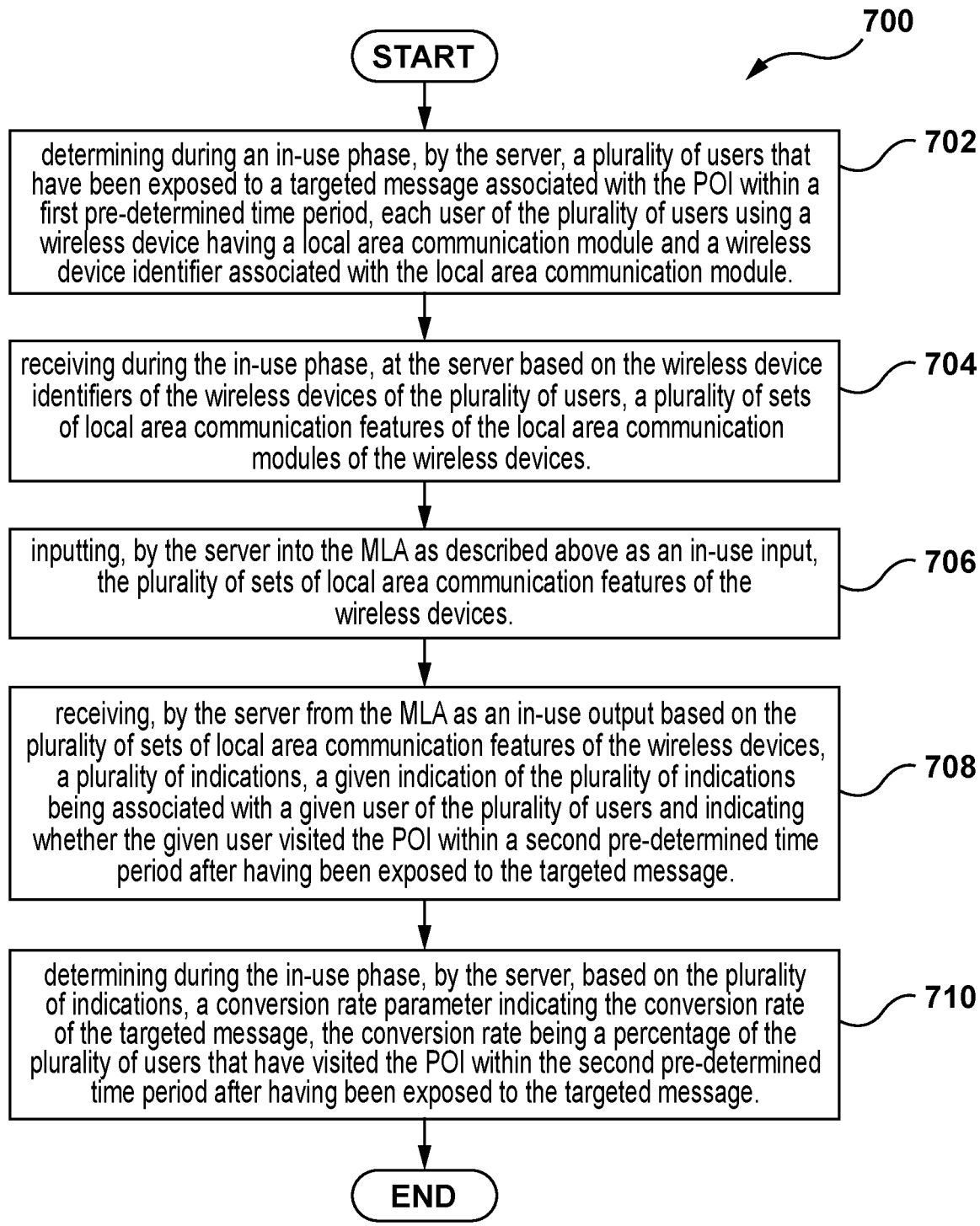
FIG. 7 depicts a logic flow diagram showing a non-limiting embodiment of another method according to the present technology.

Yet other embodiments, applications and implementations of the method 600 are likewise contemplated. For example, with reference to FIG. 7, there is shown a method 700 that is executed using the method 600.

Method of Determining a Conversion Rate of a Targeted Message

More particularly, the method 700 is a method of determining a conversion rate of a targeted message associated with a POI. As with the method 600, the method 700 may be executed at a server having a processor and a non-transient memory communicatively coupled to the processor, the non-transient memory storing processor-executable instructions thereon for executing the method.

Similar to the method 600, one example of a server suitable for executing the method 700 is the server 118. Therefore, the method 700 will be described herein next with regard to the server 118 for illustration.

Step 702—determining during an in-use phase, by the server, a plurality of users that have been exposed to a targeted message associated with the POI within a first pre-determined time period, each user of the plurality of users using a wireless device having a local area communication module and a wireless device identifier associated with the local area communication module.

In one embodiment, the method 700 starts at step 702, which includes determining during an in-use phase, by the server 118, a plurality of users that have been exposed to a targeted message associated with the target POI within a first pre-determined time period, each user of the plurality of users using a wireless device 101 having a local area communication module 109 and a wireless device identifier 206 associated with the local area communication module 109.

Referring also to FIG. 5, let's assume that the targeted message for which the method 700 will determine a conversion rate is shown on a billboard 150 and the targeted message directs viewers to the MacDonald's 500 (i.e. the target POI 134 in this example). Let's also assume that the pre-determined time period is a given day of a given week.

Further, let's assume that users U1 to Un, shown in FIG. 5, are determined by the server 118 to have been exposed to the targeted message displayed on the billboard 150 at various times during the given day of the given week.

In some non-limiting embodiments, this determination step is executed by the server 118 using the technology described in the U.S. patent application Ser. No. 16/739,668. It is contemplated that other methods for identifying users exposed to targeted messages could also be used.

Step 704—receiving during the in-use phase, at the server based on the wireless device identifiers of the wireless devices of the plurality of users, a plurality of sets of local area communication features of the local area communication modules of the wireless devices.

Once the time(s) of exposure of each of the users U1 to Un to the targeted message on the billboard 150 has been retrieved/determined by the server 118, the method 700 may proceed with receiving, during the in-use phase, at the server 118 based on the wireless device identifiers 206 of the wireless devices 101 of the plurality of users U1 to Un, a plurality of sets of local area communication features of the local area communication modules 109 of the wireless devices 101.

In some embodiments, the plurality of sets of local area communication features are the LAN snapshots 123 generated by the wireless devices 101 of the users U1 to Un which are determined by the server 118 to have been generated by the wireless devices 101 at times occurring after each of the respective users U1 to Un was exposed to the targeted message on the billboard 150.

Some of the users U1 to Un may ignore the targeted message and move about the geographical area 136 without visiting the MacDonald's 500. Some of the users U1 to Un may be convinced by the targeted message and will actually make their way to the MacDonald's 500. The timestamped LAN snapshots 123 from each of these user's devices that are generated "post-exposure" to the targeted message will reflect these movements and visits when inputted into the MLA 158.

Steps and methods for determining the LAN snapshots 123 were described above and are therefore not described again in detail.

Step 706—inputting, by the server into the MLA as described above as an in-use input, the plurality of sets of local area communication features of the wireless devices.

Once the LAN snapshots 123 are retrieved/determined by the server 118, the method 700 may proceed with inputting LAN snapshots 123, by the server 118 into the MLA 158, as an in-use input.

Step 708—receiving, by the server from the MLA as an in-use output based on the plurality of sets of local area communication features of the wireless devices, a plurality of indications, a given indication of the plurality of indications being associated with a given user of the plurality of users and indicating whether the given user visited the POI within a second pre-determined time period after having been exposed to the targeted message.

The method 700 may proceed with receiving, by the server 118 from the MLA 158 as an in-use output based on the plurality of LAN snapshots 123 (sets of local area communication features) of the wireless devices 101, a plurality of indications. The indications may be implemented in any suitable form, such as one or more suitable data packets for each indication. The indications may be characterized as follows.

A given indication of the plurality of indications may be associated with a given user of the plurality of users U1 to Un and may indicate whether the given user visited the MacDonald's 500 within a second pre-determined time period after having been exposed to the targeted message on the billboard 150.

For the sake of the present non-limiting example, let's assume that the second pre-determined time period is equal to five hours. Hence, at this step, each given indication is indicative of whether or not a given one of the users U1 to Un visited the MacDonald's 500 within five hours of having been exposed to the targeted message on the billboard 150. Understandably, the five hours is just an example and the value of the second pre-determined time period could be different.

Step 710—determining during the in-use phase, by the server, based on the plurality of indications, a conversion rate parameter indicating the conversion rate of the targeted message, the conversion rate being a percentage of the plurality of users that have visited the POI within the second pre-determined time period after having been exposed to the targeted message.

In one embodiment, the method 700 may proceed by determining, during the in-use phase, by the server 118, based on the plurality of indications, a conversion rate parameter indicating the conversion rate of the targeted message. In some non-limiting embodiments, the conversion rate is a percentage of the plurality of users that have visited a POI 134 targeted by a given targeted message within the second pre-determined time period after having been exposed to the targeted message.

Thus, in the present non-limiting example, the conversion rate is a percentage of the users U1 to Un that visited the MacDonald's 500 within the five hours following being exposed to the targeted message on the billboard 150.

While the method 700 is described above with respect to one particular example of a time, a particular a POI, and a particular offline targeted message, it is contemplated that the method 700 could be used to determine conversion rates for many different POIs, over different time frames, and for different types of targeted messages. It is contemplated that the targeted messages could be offline targeted messages, online targeted message, and/or combinations thereof.

Method of Determining Place Visits Lift

The present technology further provides for an additional particular way of using the method 600. Namely, the present technology provides for a method 800 of determining a Place Visits Lift (PVL) metric, or simply PVL.

The present technology relating to determining the PVL has been developed with the developers' appreciation that when targeted messages are directed to an offline site, such as a POI (see for example POIs 134 in FIG. 5), it is difficult to determine an efficacy of the targeted messages in directing users that were exposed to the targeted messages to the POIs that the targeted messages target. More particularly, it has been appreciated by the developers that the difficulty with determining an efficacy of targeted messages in increased at least in some cases when the targeted messages are online but the POIs that the targeted messages are directed to are offline (see for example, physical POIs 134 in FIG. 5).

In some non-limiting embodiments, determining PVL according to the present technology allows to quantify an efficacy of a given targeted message in directing users to a particular POI to which the given targeted message relates. In an aspect, increases in PVL may be said to be indicative of a measure of how much more users were persuaded by a given one or more targeted messages to visit the particular POIs that the targeted messages relate to, in comparison with users who were not exposed to the given one or more targeted messages.

Monitoring the PVL for given one or more targeted messages according to the present technology therefore allows to determine which one(s) of the given one or more targeted messages are under-performing, performing, or over-performing. Accordingly, the present technology may allow provider(s) of the given one or more targeted messages to, for example, remove under-performing targeted messages from being displayed to users and may thereby allow for resources associated with displaying such targeted messages to be reduced and/or saved. Other uses of PVL determined according to the present technology are likewise contemplated.

Figure 8:
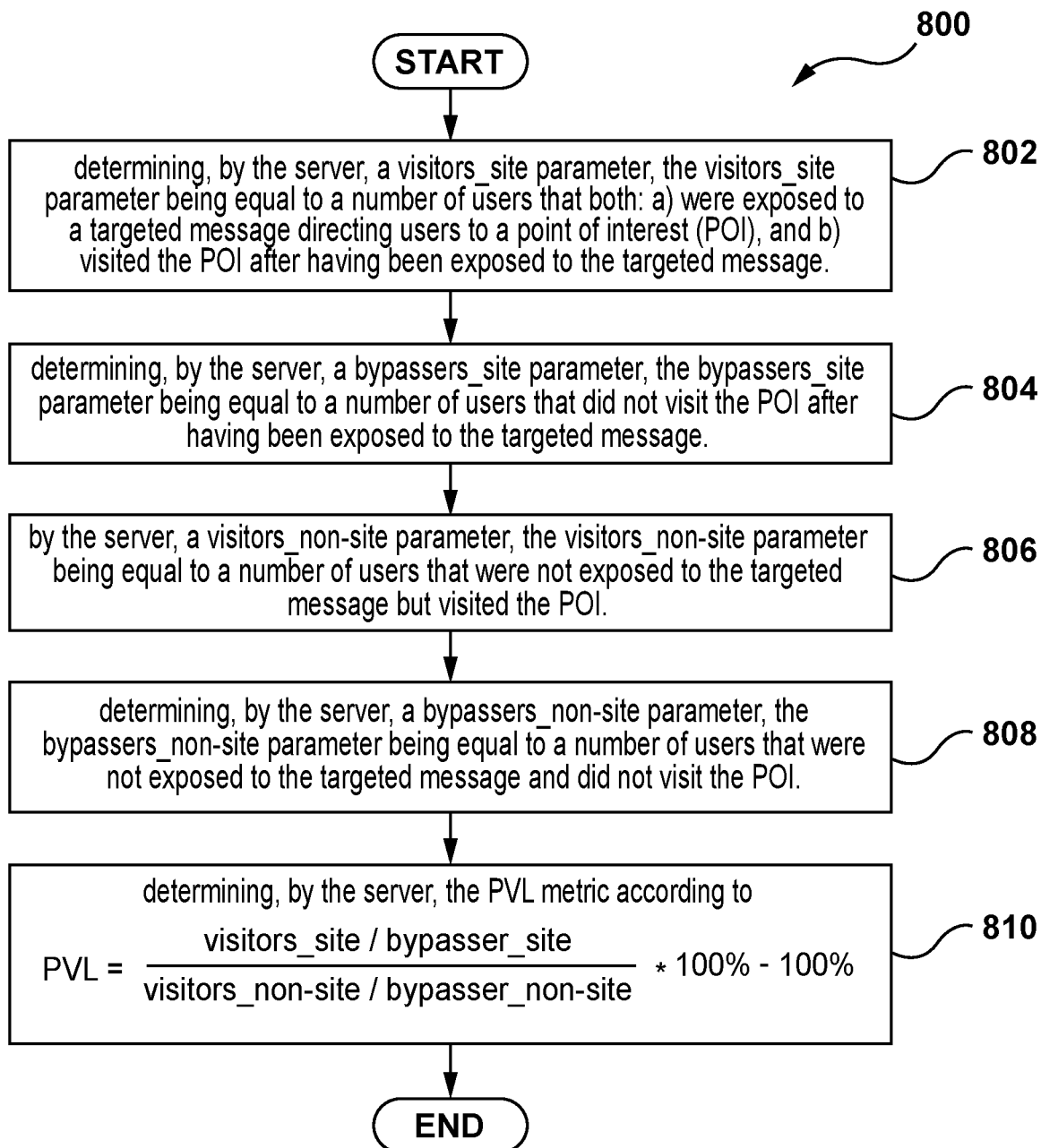
FIG. 8 depicts a logic flow diagram showing a non-limiting embodiment of yet another method according to the present technology.

A particular non-limiting embodiment of the method 800 for determining PVL according to the present technology is shown in FIG. 8, referred to next. The method 800 is executable at a server having a processor and a non-transient memory communicatively coupled to the processor, the non-transient memory storing processor-executable instructions thereon for executing the method. An example of a suitable server is server 118, described above. Thus, for simplicity and not to be limiting, the method 800 will be described and illustrated with regard to the server 118.

Step 802—determining, by the server, a visitors_site parameter, the visitors_site parameter being equal to a number of users that both: a) were exposed to a targeted message directing users to a point of interest (POI), and b) visited the POI after having been exposed to the targeted message.

In one embodiment, the method 800 starts at step 802, which includes determining, by the server 118, a visitors_site parameter.

In some non-limiting embodiments, the visitors_site parameter is equal to a number of users that were to have both: a) been exposed to a targeted message directing users to a point of interest (POI), and b) visited the POI after having been exposed to the targeted message.

As a non-limiting example, let's say the targeted message is an indication, posted on the billboard 150 shown in FIG. 5, that a deal is available for one of the products offered at the MacDonald's 500 in the geographical region 136. According to this non-limiting example then, the POI, or the target POI, of the targeted message is the MacDonald's 500 shown in FIG. 5.

In this non-limiting example, the facts and times of each of the users being exposed to the targeted message may be determined using the technology described in the U.S. patent application Ser. No. 16/739,668.

Further in this non-limiting example, the facts of the visits, or simply the visits, and the associated times of the visits of each of the (identified) users may be determined according to the method 600 described above.

Step 804—determining, by the server, a bypassers_site parameter, the bypassers_site parameter being equal to a number of users that did not visit the POI after having been exposed to the targeted message.

In some non-limiting embodiments, the method 800 may proceed by determining, by the server, a bypassers_site parameter, the bypassers_site parameter being equal to a number of users that did not visit the POI after having been exposed to the targeted message.

In this non-limiting example, for each given user of one of the wireless devices 101 that was determined to have been exposed to the targeted message displayed on the billboard 150, the method 600 described above may be used to monitor the given user's activity for at least a pre-determined period of time after the exposure.

More particularly, the method 600 may be used to determine whether at any given point in time (or at multiple given points in time) during the pre-determined period of time after the exposure, the user visited the MacDonald's 500.

Step 806—by the server, a visitors_non-site parameter, the visitors_non-site parameter being equal to a number of users that were not exposed to the targeted message but visited the POI.

In one embodiment, the method 800 may proceed by determining a visitors_non-site parameter. In some non-limiting embodiments, the visitors_non-site parameter is equal to a number of users that were not exposed to the targeted message but visited the POI.

Similar to above, the facts and times of visits may be determined by the method 600, and exposures to the targeted message may be determined using the technology described in the U.S. patent application Ser. No. 16/739,668.

Step 808—determining, by the server, a bypassers_non-site parameter, the bypassers_non-site parameter being equal to a number of users that were not exposed to the targeted message and did not visit the POI.

In one embodiment, the method 800 may proceed by determining a bypassers_non-site parameter. In some non-limiting embodiments, the bypassers_non-site parameter is equal to a number of users that were not exposed to the targeted message and did not visit the POI.

Similar to above, the facts and times of visits may be determined by the method 600, and lack of exposures to the targeted message may be determined using the technology described in the U.S. patent application Ser. No. 16/739,668.

Step 810—determining, by the server, the PVL metric.

Once all of the above parameters are determined, the method 800 may proceed to determining the PVL metric based on the determined parameters.

According to the present technology, the PVL metric is determined by the server 118, based on the parameters described above, according to the following formula:

$$PVL = \frac{visitors\_site / bypassers\_site}{visitors\_non-site / bypassers\_non-site} * 100\% - 100\%, \quad \text{Formula 1}$$

where, each of the parameters has the corresponding one of the definitions given above in the earlier steps of the method 800.

It is contemplated that in some embodiments, some but not all of the abovementioned parameters may be determined according to the present technology. While the particular targeted message used to illustrate method 800 is an offline targeted message, in some non-limiting embodiments, the method 800 is used to determine PVL for online targeted messages.

Modifications and improvements to the above-described implementations of the present technology may become apparent to those skilled in the art. The foregoing description is intended to be exemplary rather than limiting.

While particular orders of methods steps have been set out herein above, it is contemplated that other orders of method steps and/or additional and/or alternative method steps could be used to carry out the methods described herein.

Modifications and improvements to the above-described implementations of the present technology may become apparent to those skilled in the art. The foregoing description is intended to provide specific non-limiting implementations of the present technology.

The invention claimed is:

1. A method of determining a Place Visit Lift (PVL) metric, the method being executed at a server having a processor and a non-transient memory communicatively coupled to the processor, the non-transient memory storing processor-executable instructions thereon for executing the method, the method comprising:
   determining, by the server, a visitors_site parameter, the visitors_site parameter being equal to a number of users that both: a) were exposed to a targeted message directing users to a point of interest (POI), the POI being in a location, the location being associated with a local area network (LAN), the LAN including at least one wireless access point broadcasting a wireless signal and b) visited the POI after having been exposed to the targeted message;
   determining, by the server, a bypassers_site parameter, the bypassers_site parameter being equal to a number of users that did not visit the POI after having been exposed to the targeted message;
   determining, by the server, a visitors_non-site parameter, the visitors_non-site parameter being equal to a number of users that were not exposed to the targeted message but visited the POI;
   determining, by the server, a bypassers_non-site parameter, the bypassers_non-site parameter being equal to a number of users that were not exposed to the targeted message and did not visit the POI; and
   determining, by the server, the PVL metric according to a formula:

$$PVL = \frac{visitors\_site / bypassers\_site}{visitors\_non-site / bypassers\_non-site} * 100\% - 100\%,$$

at least one of the visitors_site, the bypassers_site, the visitors_non-site, and the bypassers_non-site parameters being determined by:
   determining during an in-use phase, by the server, a plurality of users that have been exposed to the targeted message associated with the POI within a first pre-determined time period, a given user of the plurality of users using a respective wireless device having a local area communication module and a wireless device identifier associated with the local area communication module;
   receiving during the in-use phase, at the server based on the wireless device identifiers of the wireless devices of the plurality of users, a plurality of sets of local area communication features of the local area communication modules of the wireless devices;
   inputting, by the server into a Machine Learning Algorithm (MLA) as an in-use input, the plurality of sets of local area communication features of the wireless devices, the MLA having been trained during a training phase based on a training dataset associated with the POI, the training phase having preceded the in-use phase, a given training object of the training dataset having been generated by:
  determining at least one geo-location of a training wireless device of a training user, the at least one geo-location having a time associated therewith that occurred before the given time, the POI being in a pre-determined vicinity of the at least geo-location;
  determining a set of training local area communication features that the training wireless device had at the time associated with the at least one geo-location, the set of training local area communication features including an indication of the training wireless device having detected from the at least one geo-location the wireless signal of the at least one wireless access point of the LAN, the training wireless device having:
    a training wireless device identifier, and
    training local area communication module,
  applying during the training phase a set of heuristics to a user profile associated with the training user to generate a training label indicative of whether the training user visited the POI at the time associated with the at least one geo-location, and
  thereby generating during the training phase the given training object having the set of training local area communication features and the training label associated therewith;
receiving, by the server from the MLA as an in-use output based on the plurality of sets of local area communication features of the wireless devices, a plurality of indications,
  a given indication of the plurality of indications being associated with the given user of the plurality of users and indicating whether the given user visited the POI within a second pre-determined time period after having been exposed to the targeted message;
generating during the in-use phase, by the server, based on the plurality of indications, the at least one of the visitors_site, the bypassers_site, the visitors_non-site, and the bypassers_non-site parameters.

2. The method of claim 1, wherein the user profile comprises a user specific portion and a device specific portion.

3. The method of claim 2, wherein the set of heuristics comprises a first subset of heuristics applicable to the user specific portion, and the first subset of heuristics being for executing a determination that the training user interacted with a resource associated with the POI, the resource including at least one of a telephone number associated with the POI, and a website associated with the POI.

4. The method of claim 3, wherein the first subset of heuristics is being further for executing a determination that the training user interacted with a web resource and the interaction with the web resource included the training user executing a web search associated with the POI.

5. The method of claim 4, wherein the web resource is a map service and the interaction was a search in the map service for the POI, the search having been executed by the training user.

6. The method of claim 2, wherein the method further comprises determining, based on the training wireless device identifier:
  a set of time-stamped geo-tracked locations of the training wireless device, the set of time-stamped geo-tracked locations being indicative of locations where the training wireless device was located over a pre-determined period of time, and wherein
  the set of heuristics comprises a second subset of heuristics applicable to the device specific portion, and the second subset of heuristics being for executing a determination based on the set of time-stamped geo-tracked locations that the training user moved to within the pre-determined vicinity of the location of the POI.

7. The method of claim 6, wherein the second subset of heuristics is further for executing a determination that the training user was exposed to the targeted message associated with the POI before having moved to within the pre-determined vicinity of the location of the POI.

8. The method of claim 7, wherein the targeted message is an online targeted message.

9. The method of claim 7, wherein the targeted message is an offline targeted message.

10. The method of claim 7, wherein the second subset of heuristics further for executing a determination that the training user moved to within the pre-determined vicinity of the location of the POI within a pre-determined time limit after having been exposed to the targeted message.

11. The method of claim 10, wherein the pre-determined time limit is less than five hours.

12. The method of claim 6, wherein the pre-determined vicinity is defined by a radius of five hundred meters away from the location of the POI.

13. The method of claim 6, wherein the pre-determined vicinity is defined by a radius of one hundred and fifty meters away from the location of the POI.

14. The method of claim 6, wherein the second subset of heuristics further being for executing a determination that the training wireless device connected, via the training communication module, to the local area network (LAN), and wherein the LAN is associated with the POI.

15. The method of claim 14, wherein the location is associated with a plurality of LANs, the plurality of LANs including the LAN, and wherein the training local area communication features include at least one of: a Service Set ID (SSID) of each LAN of the plurality of LANs, a MAC Address of a wireless access point associated with each LAN of the plurality of LANs, and a signal strength of the wireless access point associated with each LAN of the plurality of LANs.

16. A computer-implemented system for determining a Place Visit Lift (PVL) metric, the system comprising a server having a processor and a non-transient memory communicatively coupled to the processor, the non-transient memory storing processor-executable instructions which when executed cause the processor to:
  determine, by the server, a visitors_site parameter, the visitors_site parameter being equal to a number of users that both: a) were exposed to a targeted message directing users to a point of interest (POI), the POI being in a location, the location being associated with a local area network (LAN), the LAN including at least one wireless access point broadcasting a wireless signal and b) visited the POI after having been exposed to the targeted message;
  determine, by the server, a bypassers_site parameter, the bypassers_site parameter being equal to a number of users that did not visit the POI after having been exposed to the targeted message;

determine, by the server, a visitors_non-site parameter, the visitors_non-site parameter being equal to a number of users that were not exposed to the targeted message but visited the POI;

determine, by the server, a bypassers_non-site parameter, the bypassers_non-site parameter being equal to a number of users that were not exposed to the targeted message and did not visit the POI; and determine, by the server, the PVL metric according to a formula:

$$PVL = \frac{\text{visitors\_site}/\text{bypassers\_site}}{\text{visitors\_non-site}/\text{bypassers\_non-site}} * 100\% - 100\%,$$

to determine at least one of the visitors_site, the bypassers_site, the visitors_non-site, and the bypassers_non-site parameters the processor being configured to:

determine during an in-use phase, by the server, a plurality of users that have been exposed to the targeted message associated with the POI within a first pre-determined time period, a given user of the plurality of users using a respective wireless device having a local area communication module and a wireless device identifier associated with the local area communication module;

receive during the in-use phase, at the server based on the wireless device identifiers of the wireless devices of the plurality of users, a plurality of sets of local area communication features of the local area communication modules of the wireless devices;

input, by the server into a Machine Learning Algorithm (MLA) as an in-use input, the plurality of sets of local area communication features of the wireless devices, the MLA having been trained during a training phase based on a training dataset associated with the POI, the training phase having preceded the in-use phase, to generate a given training object of the training dataset the processor being configured to:

determine at least one geo-location of a training wireless device of a training user, the at least one geo-location having a time associated therewith that occurred before the given time, the POI being in a pre-determined vicinity of the at least geo-location;

determine a set of training local area communication features that the training wireless device had at the time associated with the at least one geo-location, the set of training local area communication features including an indication of the training wireless device having detected from the at least one geo-location the wireless signal of the at least one wireless access point of the LAN, the training wireless device having:
 a training wireless device identifier, and
 a training local area communication module, apply during the training phase a set of heuristics to a user profile associated with the training user to generate a training label indicative of whether the training user visited the POI at the time associated with the at least one geo-location, and thereby generate during the training phase the given training object having the set of training local area communication features and the training label associated therewith;

receive, by the server from the MLA as an in-use output based on the plurality of sets of local area communication features of the wireless devices, a plurality of indications,
 a given indication of the plurality of indications being associated with the given user of the plurality of users and indicating whether the given user visited the POI within a second pre-determined time period after having been exposed to the targeted message;

generate during the in-use phase, by the server, based on the plurality of indications, the at least one of the visitors_site, the bypassers_site, the visitors_non-site, and the bypassers_non-site parameters.

\* \* \* \* \*